US012679364B2

(12) United States Patent
Akahane et al.

(10) Patent No.: US 12,679,364 B2
(45) Date of Patent: Jul. 14, 2026

(54) VEHICLE CONTROL DEVICE, STORAGE MEDIUM STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventors: Satoru Akahane, Yokohama (JP);
Terumoto Komori, Sunto-gun (JP);
Shimpei Kokubo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 18/414,711

(22) Filed: Jan. 17, 2024

(65) Prior Publication Data

US 2024/0300494 A1 Sep. 12, 2024

(30) Foreign Application Priority Data

Mar. 10, 2023 (JP) ................................. 2023-037986

(51) Int. Cl.
*B60W 30/16* (2020.01)
*B60W 30/14* (2006.01)

(52) U.S. Cl.
CPC .......... *B60W 30/16* (2013.01); *B60W 30/143* (2013.01); *B60W 2520/10* (2013.01); *B60W 2540/223* (2020.02); *B60W 2540/229* (2020.02); *B60W 2554/4041* (2020.02); *B60W 2554/801* (2020.02); *B60W 2554/804* (2020.02)

(58) Field of Classification Search
CPC ............... B60W 30/16; B60W 30/143; B60W 2520/10; B60W 2540/223; B60W 2540/229; B60W 2554/4041; B60W 2554/801; B60W 2554/804; B60W 30/18163
See application file for complete search history.

(56) References Cited

U.S. PATENT DOCUMENTS

| | | | |
|---|---|---|---|
| 2019/0118811 A1 | 4/2019 | Watanabe et al. | |
| 2021/0146943 A1* | 5/2021 | Oniwa | B60R 21/00 |
| 2024/0124011 A1* | 4/2024 | Alzuhd | B60W 50/14 |

FOREIGN PATENT DOCUMENTS

| | | |
|---|---|---|
| JP | 2003-237407 A | 8/2003 |
| JP | 2009-211309 A | 9/2009 |
| JP | 2019-073241 A | 5/2019 |

* cited by examiner

*Primary Examiner* — Navid Z. Mehdizadeh
(74) *Attorney, Agent, or Firm* — Oliff PLC

(57) ABSTRACT

A vehicle control device has a processor configured to determine whether a host vehicle is located in a blind spot zone of another vehicle, to decide, when the host vehicle is located in a blind spot zone, to change speed of the host vehicle to initiate movement control to cause movement of the host vehicle out of the blind spot zone of the other vehicle, to determine whether a state in which the absolute value of the relative speed between the host vehicle and another vehicle is at or below a predetermined reference speed has continued for a predetermined reference time period after the movement control has been initiated, and to decide to end the movement control when the state in which the absolute value of the relative speed is at or below the reference speed has continued for the reference time period.

7 Claims, 12 Drawing Sheets

Figure 8:
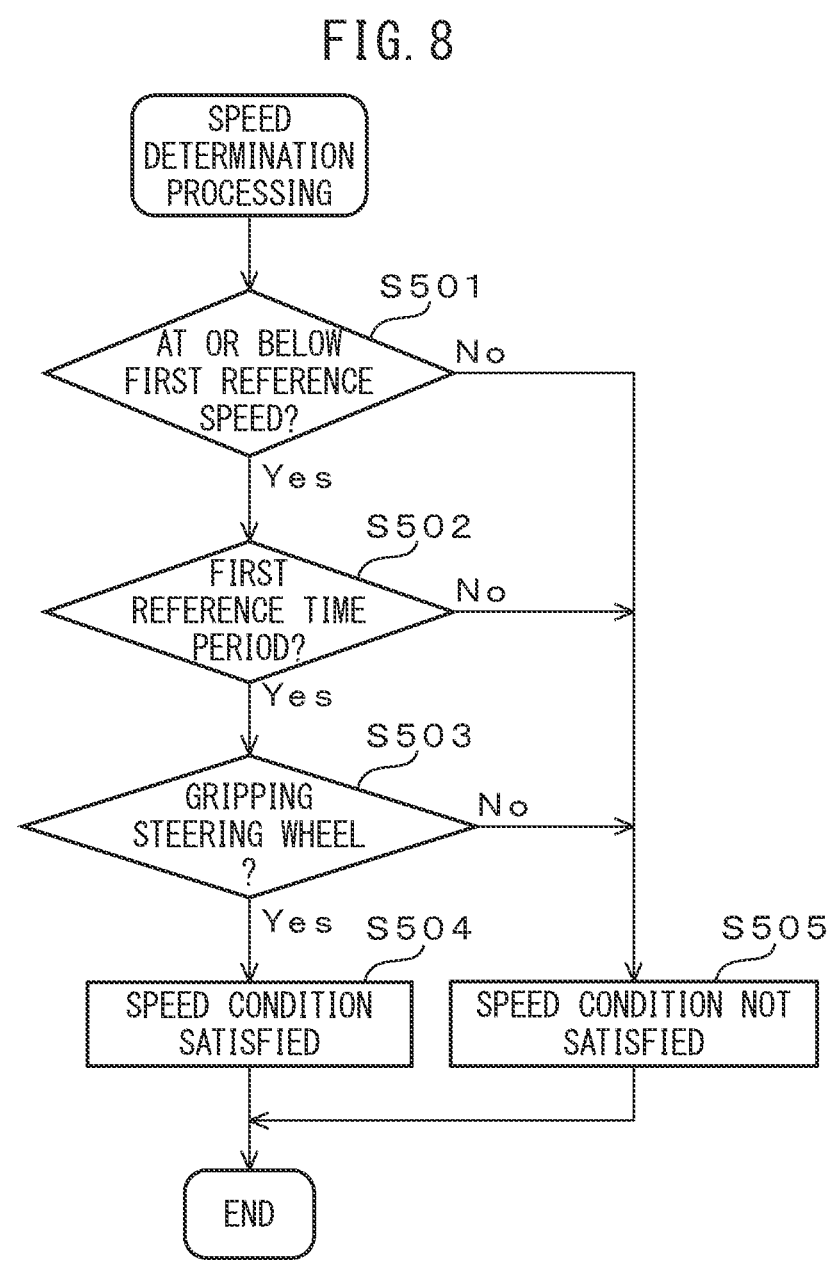

SPEED
DETERMINATION
PROCESSING

S501

AT OR BELOW
FIRST REFERENCE
SPEED?          No

Yes

S502

FIRST
REFERENCE TIME
PERIOD?          No

Yes

S503

GRIPPING
STEERING WHEEL
?          No

Yes  S504                    S505

SPEED CONDITION
SATISFIED          SPEED CONDITION NOT
SATISFIED

END

FIG. 14

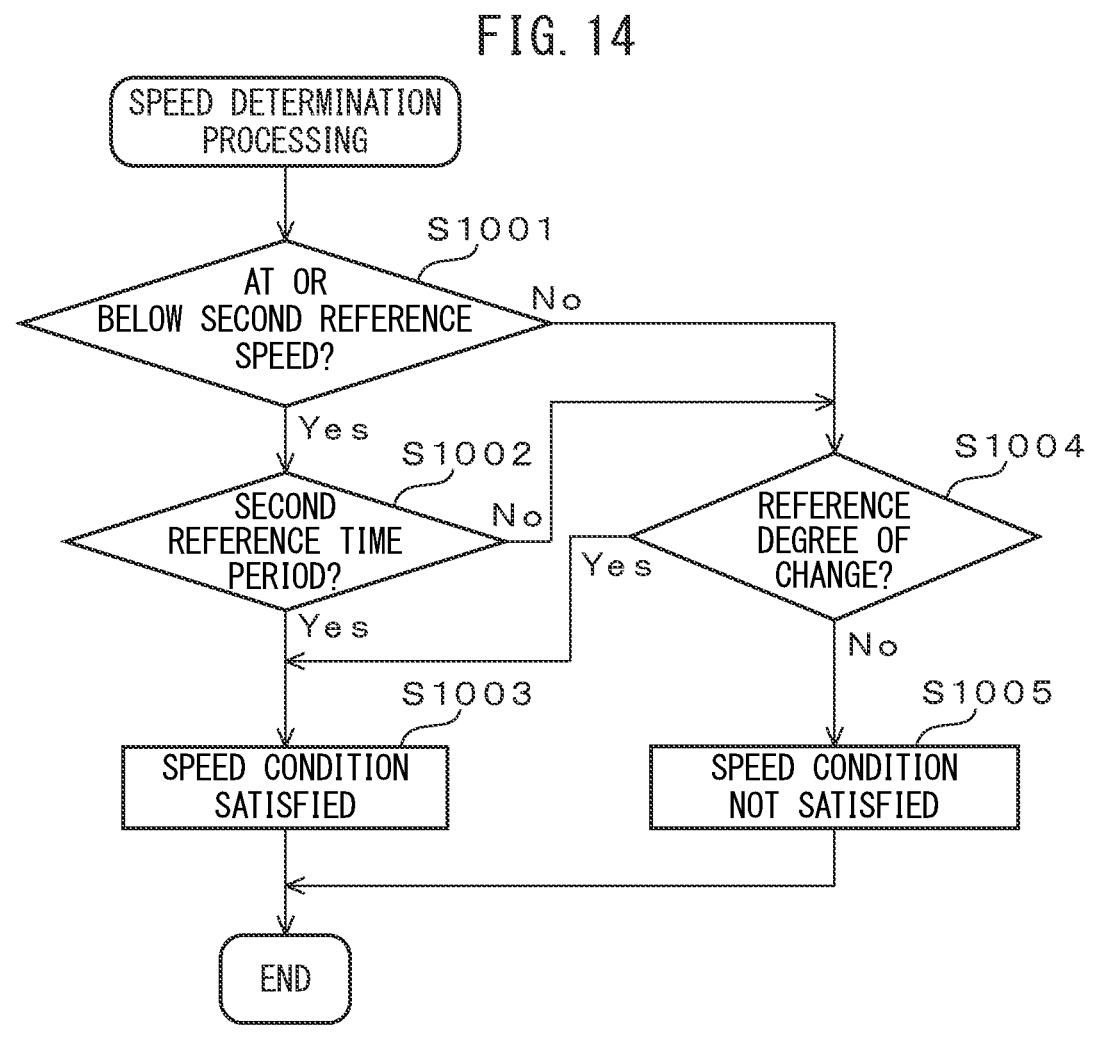

```
        ╭─────────────────────╮
        │ SPEED DETERMINATION │
        │     PROCESSING      │
        ╰─────────────────────╯
                  │
                  ▼         S1001
            ╱──────────╲
          ╱   AT OR     ╲         No
        ╱ BELOW SECOND   ╲──────────────────────┐
        ╲ REFERENCE       ╱                      │
          ╲  SPEED?     ╱                        │
            ╲──────────╱                         │
                  │ Yes    S1002                 │
                  ▼                              ▼        S1004
            ╱──────────╲                   ╱──────────╲
          ╱  SECOND     ╲       No       ╱ REFERENCE  ╲
        ╱ REFERENCE TIME ╲──────────────╱  DEGREE OF   ╲
        ╲   PERIOD?      ╱      Yes      ╲   CHANGE?    ╱
          ╲──────────╱   ◄───────────     ╲──────────╱
                  │ Yes                         │ No
                  ▼     S1003                   ▼     S1005
        ┌──────────────────┐          ┌──────────────────┐
        │ SPEED CONDITION  │          │ SPEED CONDITION  │
        │    SATISFIED     │          │  NOT SATISFIED   │
        └──────────────────┘          └──────────────────┘
                  │                             │
                  ▼◄────────────────────────────┘
            ╭─────────╮
            │   END   │
            ╰─────────╯
```

VEHICLE CONTROL DEVICE, STORAGE MEDIUM STORING COMPUTER PROGRAM FOR VEHICLE CONTROL, AND METHOD FOR CONTROLLING VEHICLE

FIELD

The present disclosure relates to a vehicle control device, a storage medium storing a computer program for vehicle control, and a method for controlling a vehicle.

BACKGROUND

An automatic control system mounted in a vehicle creates a navigation route for a host vehicle based on the current location of the host vehicle, the destination location of the host vehicle, and a navigation map. The automatic control system estimates the current location of the host vehicle using the map information and controls the vehicle to travel along the navigation route.

The automatic control system controls traveling of the host vehicle so that a safe distance is maintained between the vehicle and other vehicles. For example, the automatic control system controls the speed of the host vehicle so that a safe distance is maintained between the vehicle and other vehicles.

When it has been determined that the host vehicle is located in a blind spot zone of another vehicle traveling in an adjacent lane, the automatic control system likewise controls the host vehicle by deceleration or acceleration of the vehicle, so that it moves from the blind spot zone to a location outside of the blind spot zone. The automatic control system thereby moves the host vehicle out of the blind spot zone where it is difficult for other vehicles to recognize it, for greater safety of the host vehicle (see Japanese Unexamined Patent Publication No. 2019-72341, for example).

SUMMARY

When the automatic control system controls the host vehicle so as to move the vehicle from the blind spot zone of the other vehicle to a location outside of the blind spot zone by deceleration or acceleration of the host vehicle, the other vehicle sometimes changes its speed in the same manner as the host vehicle.

In such a case, even if control of the host vehicle continues so that the host vehicle moves from the blind spot zone of the other vehicle to a location outside of the blind spot zone, the host vehicle will still be located within the blind spot zone.

It is an object of the present disclosure to provide a vehicle control device that stops the movement control when the host vehicle continues to be located in a blind spot zone of another vehicle even though the movement control is carried out to move the host vehicle from the blind spot zone to a location outside of the blind spot zone.

(1) One embodiment of the invention provides a vehicle control device. The vehicle control device has a processor configured to determine whether or not a host vehicle is located in a blind spot zone of another vehicle based on information representing environment surrounding the host vehicle, decide to change speed of the host vehicle to initiate movement control to cause movement of the host vehicle from the blind spot zone of another vehicle to a location outside of the blind spot zone when it has been determined that the host vehicle is located in the blind spot zone of another vehicle, determine whether or not a state in which an absolute value of relative speed between the host vehicle and another vehicle is at or below a predetermined reference speed has continued for a predetermined reference time period, or whether or not a degree of change in speed of the host vehicle has reached a predetermined reference degree of change, after the movement control has been initiated, and decide to end the movement control when it has been determined that the state in which the absolute value of the relative speed between the host vehicle and another vehicle is at or below the reference speed has continued for the reference time period, or that the degree of change in the speed of the host vehicle has reached the reference degree of change.

(2) In the vehicle control device of (1) above, it is preferable that the processor is further configured to decide the reference time period so as to be shorter for a greater reference speed.

(3) In the vehicle control device of (1) or (2) above, it is preferable that the processor is further configured to decide the reference degree of change to be smaller with a higher speed of the host vehicle at the point when it has been decided to initiate movement control.

(4) In the vehicle control device of any one of (1) to (3) above, it is preferable that the processor is further configured to determine whether or not the driver is gripping a steering wheel or the driver is looking at a speed display unit, and the state in which the absolute value of the relative speed between the host vehicle and another vehicle is at or below the reference speed has continued for the reference time period, and to decide to end the movement control when it has been determined that the driver is gripping the steering wheel or the driver is looking at the speed display unit, and the state in which the absolute value of the relative speed between the host vehicle and the other vehicle is at or below the reference speed has continued for the reference time period.

(5) In the vehicle control device of any one of (1) to (4) above, it is preferable that the processor is further configured to determine whether or not the driver is gripping a steering wheel or the driver is looking at a speed display unit, and the degree of change in the speed of the host vehicle has reached the reference degree of change, and to decide to end the movement control when it has been determined that the driver is gripping the steering wheel or the driver is looking at the speed display unit, and the degree of change in the speed of the host vehicle has reached the reference degree of change.

(6) In the vehicle control device of any one of (1) to (5) above, it is preferable that the processor is further configured to decide to control the speed of the host vehicle so that the host vehicle is accelerated or decelerated in the direction opposite from the direction in which the speed of the host vehicle has changed by the movement control when it has been decided to end the movement control.

(7) According to another embodiment, a storage medium storing a computer program for vehicle control is provided. The computer program for vehicle control causes a processor to execute a process and the process includes determining whether or not a host vehicle is located in a blind spot zone of another vehicle based on information representing environment surrounding the host vehicle, deciding to change speed of the host vehicle to initiate movement control to cause movement of the host vehicle from the blind spot zone of another vehicle to a location outside of the blind spot zone when it has been determined that the host vehicle is located in the blind spot zone of another vehicle, determining whether or not a state in which an absolute value of relative speed between the host vehicle and another vehicle is at or below a predetermined reference speed has continued for a predetermined reference time period, or whether or not a degree of change in speed of the host vehicle has reached a predetermined reference degree of change, after the movement control has been initiated, and deciding to end the movement control when it has been determined that the state in which the absolute value of the relative speed between the host vehicle and the other vehicle is at or below the reference speed has continued for the reference time period, or that the degree of change in the speed of the host vehicle has reached the reference degree of change.

(8) Another embodiment of the invention provides a method for controlling a vehicle. The method for controlling a vehicle is carried out by a vehicle control device and includes determining whether or not a host vehicle is located in a blind spot zone of another vehicle based on information representing environment surrounding the host vehicle, deciding to change speed of the host vehicle to initiate movement control to cause movement of the host vehicle from the blind spot zone of another vehicle to a location outside of the blind spot zone when it has been determined that the host vehicle is located in the blind spot zone of another vehicle, determining whether or not a state in which an absolute value of relative speed between the host vehicle and another vehicle is at or below a predetermined reference speed has continued for a predetermined reference time period, or whether or not a degree of change in speed of the host vehicle has reached a predetermined reference degree of change, after the movement control has been initiated, and deciding to end the movement control when it has been determined that the state in which the absolute value of the relative speed between the host vehicle and the other vehicle is at or below the reference speed has continued for the reference time period, or that the degree of change in the speed of the host vehicle has reached the reference degree of change.

The vehicle control device of the disclosure ends the movement control when, after the movement control has been initiated to move the host vehicle to a location outside of a blind spot zone of another vehicle by changing the speed of the host vehicle, the relative speed difference with the other vehicle continues to be small or the degree of change in speed is large, while the host vehicle remains located in the blind spot zone. This allows the host vehicle to accelerate or decelerate to move out of the blind spot zone.

The object and advantages of the invention will be realized and attained by means of the elements and combinations particularly pointed out in the claims. It is to be understood that both the foregoing general description and the following detailed description are exemplary and explanatory, and are not restrictive of the invention as claimed.

BRIEF DESCRIPTION OF DRAWINGS

FIG. 7 is a diagram showing another example of the relationship between speed and time.

FIG. 8 is an example of an operation flow chart for speed determination processing according to modified example 1, by the drive planning device of the first embodiment.

FIG. 14 is an example of an operation flow chart for speed determination processing according to a modified example, by the drive planning device of the second embodiment.

DESCRIPTION OF EMBODIMENTS

Figure 1A:
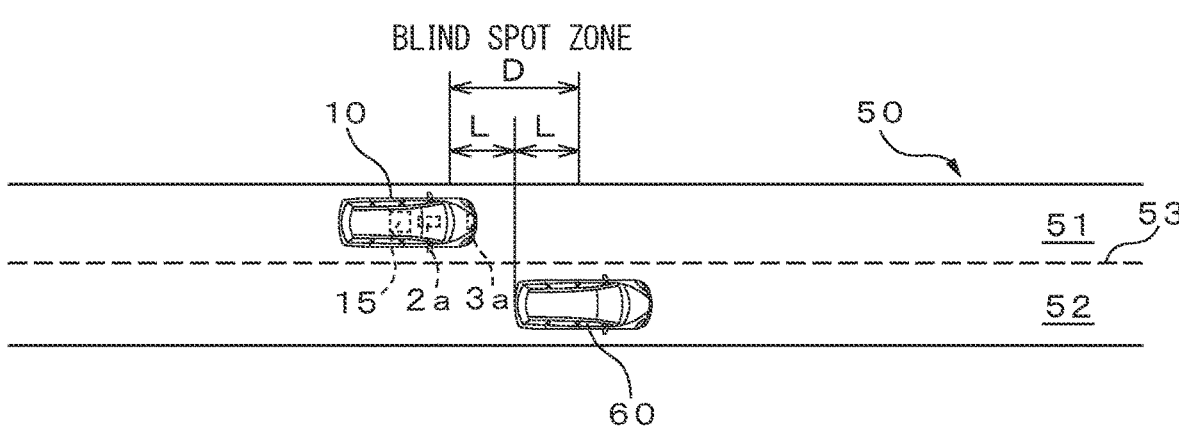
FIG. 1A is a diagram illustrating operation of a drive planning device according to a first embodiment in overview, showing a vehicle located in a blind spot zone.
Figure 1B:
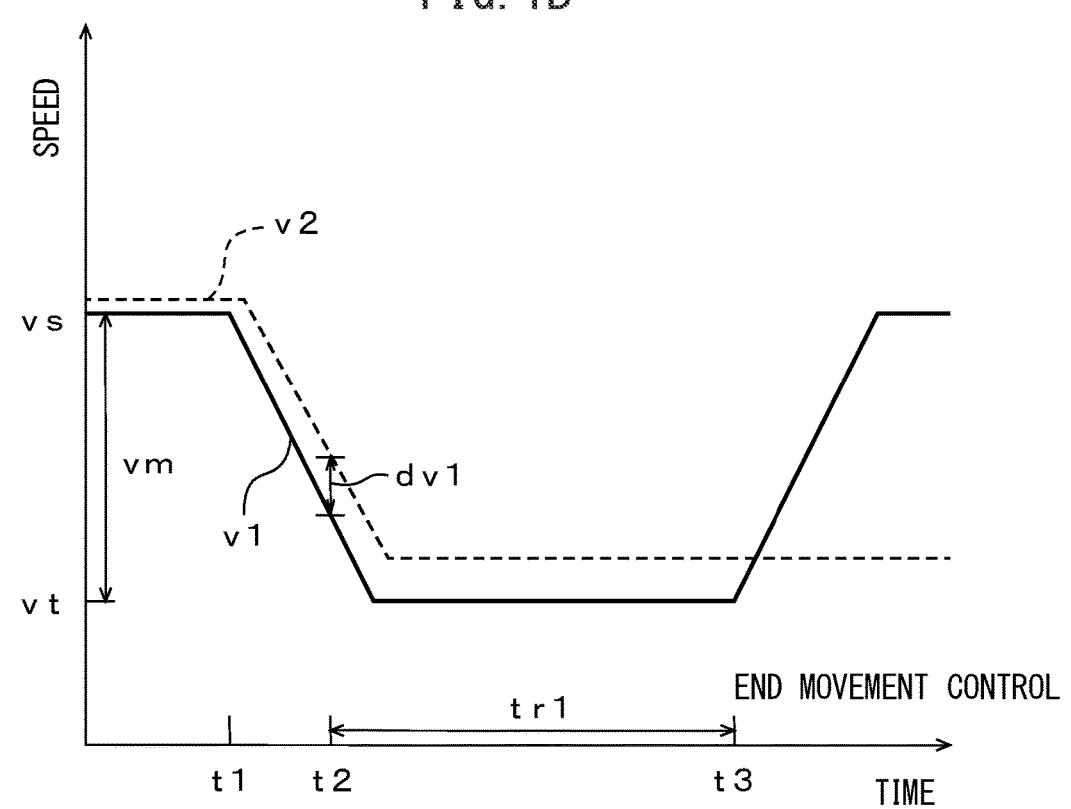
FIG. 1B is a diagram illustrating operation of the drive planning device of the first embodiment in overview, showing an example of the relationship between speed and time.
Figure 2:
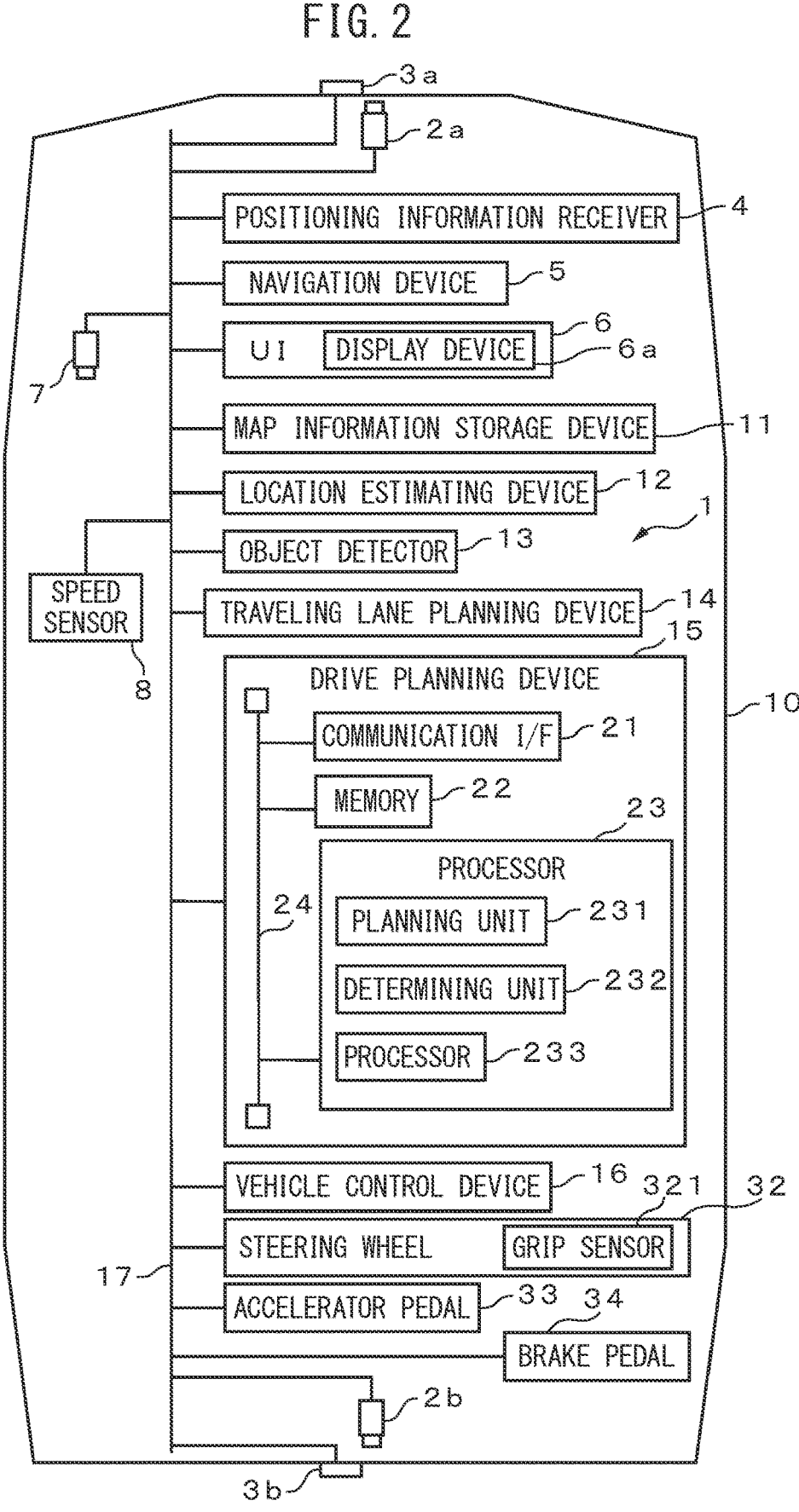
FIG. 2 is a hardware configuration diagram for a vehicle in which the drive planning device of the first embodiment is mounted.

FIG. 1A and FIG. 1B are diagrams showing operation of the drive planning device 15 according to the first embodiment in overview. FIG. 1A shows a vehicle 10 located in a blind spot zone, and FIG. 1B is a graph showing an example of the relationship between speed and time. FIG. 2 is a hardware configuration diagram for a vehicle in which the drive planning device of the first embodiment is mounted.

As shown in FIG. 1A, the vehicle 10 is traveling on a road 50. The road 50 has two lanes 51, 52. The lane 51 and lane 52 are divided by a lane marking line (lane boundary line) 53. The vehicle 10 is traveling in the lane 51. Another vehicle 60 is also traveling, in the adjacent lane 52 which is adjacent to the traffic lane 51.

The vehicle 10 has a drive planning device 15. The vehicle 10 has a self-driving mode in which the vehicle 10 is driven primarily by automatic control by the vehicle 10, and a manual driving mode in which the vehicle 10 is driven primarily by the driver. The vehicle 10 is currently being controlled in self-driving mode. The vehicle 10 may also be a self-driving vehicle. The drive planning device 15 is an example of the vehicle control device.

The drive planning device 15 determines that the vehicle 10 is located in a blind spot zone D of the vehicle 60, based on information output from a camera 2a and a LIDAR sensor 3a. The vehicle 10 located in the blind spot zone D is difficult to recognize by the driver driving the vehicle 60 or the sensors (not shown) of the vehicle 60.

The drive planning device 15 decides to initiate movement control to cause the vehicle 10 to move from the blind spot zone D of the vehicle 60 to a location outside of the blind spot zone D, by changing the speed of the vehicle 10.

As shown in FIG. 1B, the drive planning device 15 decides to initiate the movement control of the vehicle 10 at time t1, so that the vehicle 10 is decelerated and moves behind the blind spot zone D of the vehicle 60.

The drive planning device 15 generates a driving plan to lower the speed v1 of the vehicle 10 from a speed vs to a maximum deceleration amount vm at time t1, so that it travels at speed vt.

After the vehicle 10 has initiated the movement control, the vehicle 60 was changed to speed v2, similar to the vehicle 10. The vehicle 10 therefore continues to be located in the blind spot zone D of the vehicle 60, even though the movement control was executed.

The drive planning device 15 has determined that the absolute value of the relative speed between the vehicle 10 and vehicle 60 (v2-v1) is at or below a first reference speed dv1, at time t2 while the movement control is being executed.

Since at state in which the absolute value of the relative speed between the vehicle 10 and vehicle 60 is at or below the first reference speed dv1 has continued for a first reference time period tr1 at time t3, the drive planning device 15 decides to end the movement control.

The drive planning device 15 generates a driving plan for the speed of the vehicle 10 so that the vehicle 10 travels at a driver-set speed. The vehicle 10 passes the vehicle 60 and moves from the blind spot zone D of the vehicle 60 to a location outside of the blind spot zone D.

As explained above, the drive planning device 15 of the embodiment ends the movement control when, after the movement control has been initiated to move the vehicle 10 out of the blind spot zone D of the vehicle 60 by changing the speed of the vehicle 10, the vehicle 10 continues to have a small relative speed with respect to the vehicle 60 while remaining located in the blind spot zone D. This allows the vehicle 10 to be accelerated or decelerated to move out of the blind spot zone D.

FIG. 2 is a hardware configuration diagram of a vehicle 10 in which a vehicle control system 1 is mounted that has a drive planning device 15. The vehicle 10 has cameras 2a and 2b, LiDAR sensors 3a, 3b, a positioning information receiver 4, a navigation device 5, a user interface (UI) 6, a monitoring camera 7, a speed sensor 8, a map information storage device 11, a location estimating device 12, an object detector 13, a traveling lane planning device 14, a drive planning device 15, a vehicle control device 16, a steering wheel 32, an accelerator pedal 33 and a brake pedal 34. The vehicle control system 1 may also have a radar sensor, as another distance sensor (not shown) for measurement of the distance of the vehicle 10 to surrounding objects.

The cameras 2a, 2b, LiDAR sensors 3a, 3b, positioning information receiver 4, navigation device 5, UI 6, monitoring camera 7, speed sensor 8, map information storage device 11, location estimating device 12, object detector 13, traveling lane planning device 14, drive planning device 15, vehicle control device 16, steering wheel 32, accelerator pedal 33 and brake pedal 34 are connected in a communicable manner via an in-vehicle network 17 conforming to the Controller Area Network standard.

The cameras 2a, 2b are examples of imaging units provided in the vehicle 10. The camera 2a is mounted inside the vehicle 10 and directed toward the front of the vehicle 10. The camera 2b is mounted inside the vehicle 10 and directed toward the rear of the vehicle 10. The cameras 2a, 2b each take a camera image in which the environment of a predetermined region ahead of and behind the vehicle 10 is shown, at a camera image photograph time set to a predetermined cycle, for example. The camera image can show the road in the predetermined region ahead of or behind the vehicle 10, and road features such as surface lane marking lines on the road. A camera image taken by the camera 2a may also have other vehicles located at the left front, front and right front of the vehicle 10. A camera image taken by the camera 2b may have other vehicles located at the left rear, rear and right rear of the vehicle 10. The cameras 2a, 2b each have a 2D detector composed of an array of photoelectric conversion elements with visible light sensitivity, such as a CCD or C-MOS, and an imaging optical system that forms an image of the photographed region on the 2D detector.

Each time a camera image is taken, the cameras 2a, 2b output camera images and camera image photograph times at which the camera images were taken, through the in-vehicle network 17 to the location estimating device 12 and object detector 13. The camera image is also used for processing at the location estimating device 12 to estimate the location of the vehicle 10. At the object detector 13, the camera image is used for processing to detect other objects surrounding the vehicle 10. The camera image is an example of information representing the environment surrounding the vehicle 10.

Each of the LiDAR sensors 3a, 3b is mounted on the outer side of the vehicle 10, for example, being directed toward the front or rear of the vehicle 10. The LiDAR sensors 3a and 3b respectively synchronize and emit a scanning pulsed laser ahead and to the rear of the vehicle 10, at a reflected wave information acquisition time set with a predetermined cycle, and receive a reflected wave that has been reflected from a reflector. The time required for the reflected wave to return contains information for the distance between the vehicle 10 and other objects located in the direction in which the laser has been emitted. Each of the LiDAR sensors 3a, 3b outputs the reflected wave information that includes the laser emission direction and the time required for the reflected wave to return, together with the reflected wave information acquisition time at which the laser was emitted, through the in-vehicle network 17 to the object detector 13. At the object detector 13, the reflected wave information is used for processing to detect objects surrounding the vehicle 10. The reflected wave information is an example of information representing the environment surrounding the vehicle 10.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11, each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route from the current location to the destination location of the vehicle 10. When the destination location has been newly set or the current location of the vehicle 10 has exited the navigation route, the navigation device 5 creates a new navigation route for the vehicle 10. Every time a navigation route is created, the navigation device 5 outputs the navigation route to the location estimating device 12 and the traveling lane planning device 14, via the in-vehicle network 17.

The UI 6 is an example of the notification unit. The UI 6, controlled by the navigation device 5 and drive planning device 15, notifies the driver of the vehicle 10 traveling information. The traveling information of the vehicle 10 includes information relating to the current location of the vehicle 10 and the current and future route of the vehicle 10, such as the navigation route. The UI 6 has a display device 6a such as a liquid crystal display or touch panel, for display of the traveling information. The UI 6 may also have an acoustic output device (not shown) to notify the driver of traveling information. The UI 6 also generates an operation signal in response to operation of the vehicle 10 by the driver. The UI 6 also has a touch panel or operating button, for example, as an input device for inputting operation information from the driver to the vehicle 10. The operation information may be, for example, a destination location, transit points, vehicle speed, intervehicular distance or other control information of the vehicle 10. The UI 6 outputs the input operation information to the navigation device 5, the drive planning device 15 and the vehicle control device 16, via the in-vehicle network 17.

The monitoring camera 7 is disposed inside the vehicle in a manner allowing it to photograph facial images including the face of the driver driving the vehicle 10. The monitoring camera 7 is an example of an imaging unit. The monitoring camera 7 photographs a facial image representing the conditions including the driving seat at a facial imaging time at a predetermined cycle. The monitoring camera 7 has a 2D detector composed of an array of photoelectric conversion elements with infrared sensitivity, such as a CCD or C-MOS, and an imaging optical system that forms an image of the photographed region on the 2D detector. The facial image is used for processing by the drive planning device 15 to estimate the direction of the line of sight of the driver.

The speed sensor 8 detects speed information representing the speed of the vehicle 10. The speed sensor 8 has a measuring device that measures the rotational speed of the tires of the vehicle 10. The speed sensor 8 outputs the speed information to the drive planning device 15 via the in-vehicle network 17. The speed information is used for processing by the drive planning device 15 to calculate the speed of the vehicle 10.

The steering wheel 32 generates a steering signal corresponding to the steering angle created by the driver, and outputs it to the drive planning device 15 and vehicle control device 16 via the in-vehicle network 17. The steering wheel 32 may also have a grip sensor 321 that detects gripping by the driver. When the grip sensor 321 detects gripping of the steering wheel 32 by the driver, it generates a grip signal and outputs it to the drive planning device 15 via the in-vehicle network 17.

The accelerator pedal 33 generates an accelerator operation signal corresponding to the accelerator level created by the driver, and outputs it to the drive planning device 15 and vehicle control device 16 via the in-vehicle network 17.

The brake pedal 34 generates a brake operation signal corresponding to the brake level created by the driver, and outputs it to the drive planning device 15 and vehicle control device 16 via the in-vehicle network 17.

The map information storage device 11 stores wide-area map information for a relatively wide area (an area of 10 to 30 km², for example) that includes the current location of the vehicle 10. The map information preferably has high-precision map information including three-dimensional information for the road surface, information for the types and locations of structures and road features such as road lane marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 m² to 10 km²), through the in-vehicle network 17 to the location estimating device 12, object detector 13, traveling lane planning device 14, drive planning device 15 and vehicle control device 16.

The location estimating device 12 estimates the location of the vehicle 10 at the camera image photograph time, based on the road features surrounding the vehicle 10 represented in the camera image taken by the camera 2a. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16. The location estimating device 12 may estimate the location of the vehicle 10 based on two camera images taken by the camera 2b.

The object detector 13 detects objects at the left front, front and right front of the vehicle 10, and their type, based on the camera images taken by the camera 2a. The object detector 13 also detects objects at the left rear, rear and right rear of the vehicle 10, and their type, based on the camera images taken by the camera 2b. Objects also include other vehicles traveling around the vehicle 10. The object detector 13 has a classifier that detects objects represented in the camera image, by inputting the image, for example. The classifier may use a deep neural network (DNN) that has been trained to detect objects represented in input images, for example. The object detector 13 used may also be a classifier other than a DNN. For example, the classifier used by the object detector 13 may be a support vector machine (SVM) that has been trained to output a confidence factor for representation of objects to be detected in the window, with the input being a feature descriptor (such as Histogram of Oriented Gradients, HOG, for example) calculated from a window set in the camera image. Alternatively, the object detector 13 may detect an object region by template matching between the image and a template in which an object to be detected is represented.

The object detector 13 also detects objects at the left front, front and right front of the vehicle 10, based on reflected wave information output by the LiDAR sensor 3$a$, and detects objects at the left rear, rear and right rear of the vehicle 10, based on reflected wave information output by the LiDAR sensor 3$b$. The object detector 13 can also determine the orientation of an object with respect to the vehicle 10 based on the location of the object in the camera image, and may determine the distance between the object and the vehicle 10, based on the orientation and on the reflected wave information output by the LiDAR sensors 3$a$, 3$b$. The object detector 13 estimates the location of the object represented in a world coordinate system based on the current location of the vehicle 10, and the distance of the object from the vehicle 10 and its orientation, for example. The object detector 13 also tracks objects to be detected from an updated image, by matching objects detected in the updated camera image with objects detected in previous images, according to a tracking process based on optical flow. The object detector 13 also calculates the trajectory of an object being tracked, based on the location of the object in an image updated from a previous image, represented in the world coordinate system. The object detector 13 estimates the speed of an object with respect to the vehicle 10, based on changes in the location of the object over the course of time. The object detector 13 can also estimate the acceleration of an object based on changes in the speed of the object over the course of time. In addition, the object detector 13 identifies the traveling lanes in which the objects are traveling, based on the lane marking lines represented in the map information and the locations of the objects. The object detector 13 also determines, for example, whether an object is traveling in a traffic lane defined by two mutually adjacent lane marking lines situated on either side of the center location of the object in the lateral direction. The object detector 13 outputs object detection information which includes information representing the types of objects that were detected, information indicating their locations, and also information indicating their speeds, accelerations and traveling lanes, to the traveling lane planning device 14, drive planning device 15 and vehicle control device 16. When the object is another vehicle, the location of the object includes the location of the center of gravity of the vehicle and the location of the rear end of the vehicle. The object detection information is generated based on information representing the environment surrounding the vehicle 10. The object detection information is an example of information representing the environment surrounding the vehicle 10.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing lane. Each time a traveling lane plan is created, the traveling lane planning device 14 outputs the traveling lane plan to the drive planning device 15.

The traveling lane planning device 14 also determines whether or not a lane change is necessary within the nearest driving zone selected from the navigation route, based on the traveling lane plan, the map information, the navigation route and the current location of the vehicle 10, and generates a lane change plan in accordance with the determination results. The lane change plan includes a lane change schedule zone in the lane in which the vehicle 10 is traveling, where it is scheduled to move to an adjacent lane. Specifically, the traveling lane planning device 14 determines whether or not a lane change is necessary for moving to a traffic lane toward the destination location of the vehicle 10, based on the navigation route and the current location of the vehicle 10. The traveling lane planning device 14 determines whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out. The traveling lane planning device 14 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. The traveling lane planning device 14 also generates a lane change plan in response to a driver request. Information indicating the speed of the vehicle 10 and its acceleration is acquired using a sensor (not shown) mounted on the vehicle 10.

The drive planning device 15 carries out plan processing, determination processing and decision processing. The drive planning device 15 comprises a communication interface (IF) 21, a memory 22 and a processor 23 for this purpose. The communication interface 21, memory 22 and processor 23 are connected via signal wires 24. The communication interface 21 has an interface circuit to connect the drive planning device 15 with the in-vehicle network 17.

The memory 22 is an example of a memory unit, and it has a volatile semiconductor memory and a non-volatile semiconductor memory, for example. The memory 22 stores an application computer program and various data to be used for information processing carried out by the processor 23 of each device.

All or some of the functions of the drive planning device 15 are functional modules driven by a computer program operating on the processor 23, for example. The processor 23 has a planning unit 231, a determining unit 232 and a deciding unit 233. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit.

At a driving plan creation time set with a predetermined cycle, the planning unit 231 carries out driving plan processing in which it generates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The planning unit 231 generates a driving plan to maintain a spacing of at least a predetermined distance between the vehicle 10 and other vehicles. The planning unit 231 creates the driving plan for travel based on the speed set by the driver (hereunder also referred to as "set speed"). The planning unit 231 also creates the driving plan for travel based on the intervehicular distance set by the driver (hereunder also referred to as "set intervehicular distance"). The planning unit 231 outputs the driving plan to the vehicle control device 16 for each driving plan generated. Other operation by the drive planning device 15 will be described in detail below.

The vehicle control device 16 has two control modes with different degrees of participation of the driver in driving. The vehicle control device 16 controls the operation of the vehicle 10 according to the control mode.

For example, the vehicle control device 16 has a self-driving mode in which the degree to which the driver participates in driving is low (for example, driving mode with levels 3 to 5) and a manual driving mode in which the degree to which the driver participates in driving is high (for example, driving mode with levels 0 to 2). In self-driving mode, the vehicle 10 is driven primarily by the vehicle control device 16. In manual driving mode, the vehicle 10 is driven primarily by the driver.

In self-driving mode in which the degree to which the driver participates in driving is low, all or some of the driving operations necessary for traveling of the vehicle 10 are executed automatically, while in manual driving mode in which the degree to which the driver participates in driving is high, the types of driving operations executed automatically are less than in the driving mode in which the degree to which the driver participates in driving is low, or are zero.

When the vehicle 10 is driven in self-driving mode, the vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also outputs a control signal corresponding to the set accelerator level, to a drive unit such as an engine or motor (not shown) of the vehicle 10, via the in-vehicle network 17. Alternatively, the vehicle control device 16 may output a control signal corresponding to a set brake level to the brake (not shown) of the vehicle 10, via the in-vehicle network 17.

In manual driving mode, on the other hand, the driver can use the steering wheel 32, accelerator pedal 33 and brake pedal 34 for operation of the vehicle 10. When the vehicle 10 is operated manually, the vehicle control device 16 controls the steering wheel, drive unit or brake according to the steering signal, accelerator operation signal or brake operation signal according to operation by the driver. In manual driving mode, at least one operation of the vehicle 10 from among driving, braking and steering is controlled manually. A change from automatic control to manual control is possible, depending on the request by the driver.

Even when the vehicle 10 is operated in self-driving mode, the vehicle control device 16 still controls the steering wheel, drive unit or brake based on the steering signal, accelerator operation signal or brake operation signal according to operation by the driver, when these signals have been output.

The drive planning device 15 is an electronic control unit (ECU), for example. For FIG. 2, the map information storage device 11, location estimating device 12, object detector 13, traveling lane planning device 14, drive planning device 15 and vehicle control device 16 were explained as separate devices, but all or some of them may be constructed in a single device.

Figure 3:
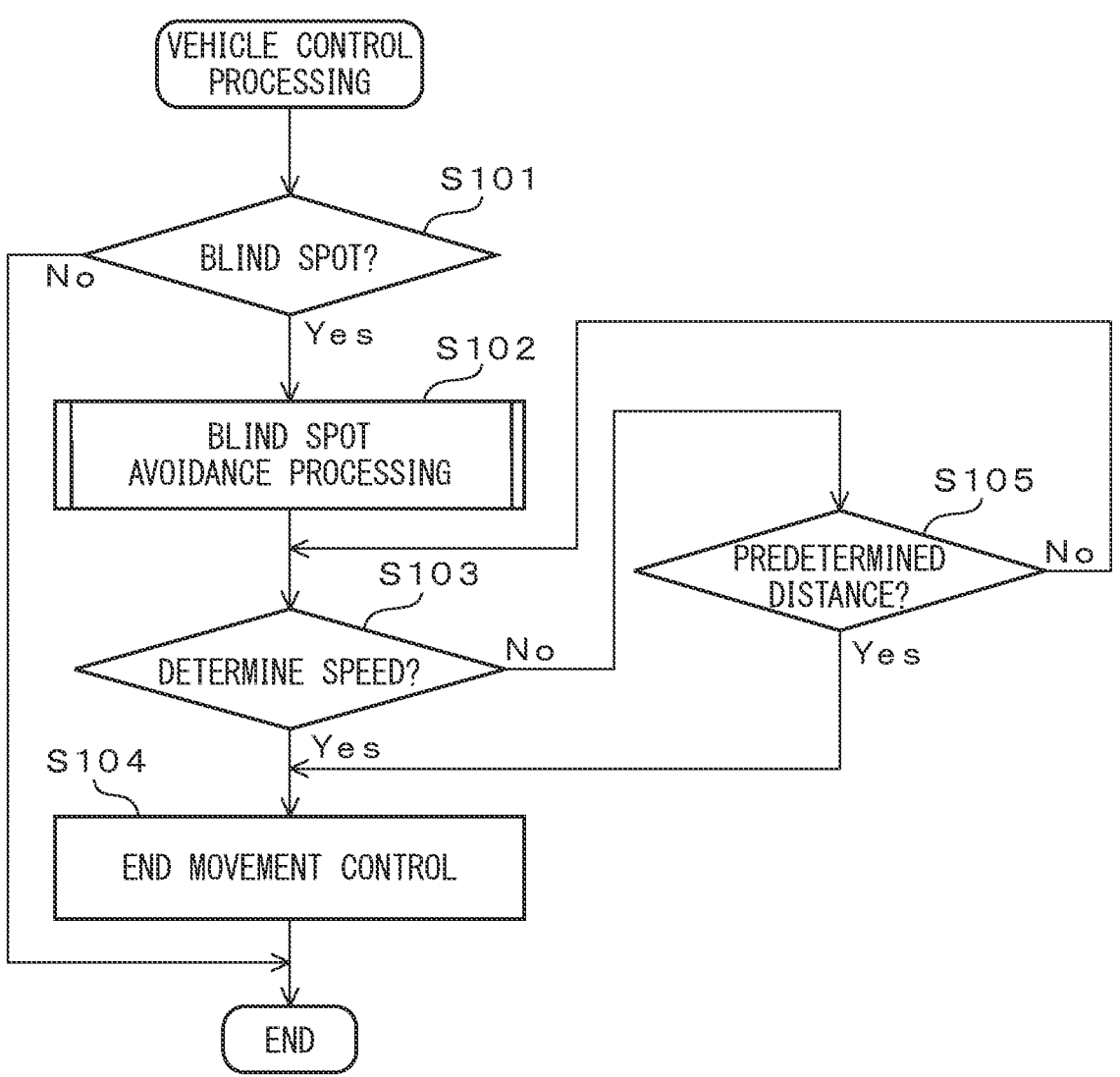
FIG. 3 is an example of an operation flow chart for vehicle control processing by a drive planning device of the first embodiment.

FIG. 3 is an example of an operation flow chart for vehicle control processing by a drive planning device 15 of the embodiment. Vehicle control processing by the drive planning device 15 will be described with reference to FIG. 3. The drive planning device 15 carries out vehicle control processing according to the operation flow chart shown in FIG. 3, at a vehicle control time having a predetermined cycle.

First, the determining unit 232 determines whether or not the vehicle 10 is located in a blind spot zone of another vehicle based on information representing the environment surrounding the vehicle 10 (blind spot determination processing) (step S101). Blind spot determination processing is described below with reference to FIG. 4. The determining unit 232 is an example of a first determining unit.

When the vehicle 10 is located in a blind spot zone of another vehicle (step S101—Yes), the determining unit 232 and deciding unit 233 carry out blind spot avoidance processing in which they decide the direction in which to change the speed of the vehicle 10, in order to move the vehicle 10 out of the blind spot zone (step S102). Blind spot avoidance processing is described below with reference to FIG. 5. In blind spot avoidance processing, it is decided to change either the direction of acceleration or the direction of deceleration of the speed of the vehicle 10, and to initiate the movement control to cause the vehicle 10 to move from the blind spot zone of the other vehicle to a location outside of the blind spot zone. The deciding unit 233 is an example of a first deciding unit. The planning unit 231 creates a driving plan which includes the movement control based on the decision in blind spot avoidance processing. The vehicle control device 16 carries out the movement control based on the driving plan.

The determining unit 232 then determines whether or not a condition in which the absolute value of the relative speed between the vehicle 10 and the other vehicle is at or below the first reference speed has continued for the first reference time period, while the movement control is being executed (speed determination processing) (step S103). Speed determination processing is described below with reference to FIG. 6. The determining unit 232 is an example of the second determining unit.

When the state at or below the first reference speed has continued for the first reference time period (step S103—Yes), the deciding unit 233 decides to end the movement control (step S104), and the series of processing steps is complete. The deciding unit 233 is an example of the second deciding unit.

When the state at or below the first reference speed has not continued for the first reference time period (step S103—No), the determining unit 232 determines whether or not the location of the vehicle 10 is separated by a predetermined distance from the other vehicle (step S105). When the distance between the vehicle 10 and the other vehicle traveling in the adjacent lane in the traveling direction of the vehicle 10 is at least a predetermined distance (such as 35 m), the determining unit 232 determines that they are separated by the predetermined distance. The vehicle 10 is not located in a blind spot zone of the other vehicle. Moreover since the vehicle 10 is separated from the other vehicle by an adequate distance it is unlikely that the vehicle 10 is located in a blind spot zone of the other vehicle, and therefore the movement control is ended.

When the distance between the vehicle 10 and the other vehicle traveling in the adjacent lane in the traveling direction of the vehicle 10 is less than the predetermined distance, on the other hand, the determining unit 232 determines that they are not separated by the predetermined distance. The movement control is continued in this case.

When there is separation by the predetermined distance (step S105—Yes), processing proceeds to step S104. When there is not separation by the predetermined distance (step S105—No), processing returns to step S103.

When the vehicle 10 is not located in the blind spot zone of the other vehicle (step S101—No), the series of processing steps is complete.

The drive planning device 15 preferably does not carry out the vehicle control processing described above for a predetermined time after the movement control has been ended. This can prevent the vehicle 10 from again initiating the same the movement control with respect to the other vehicle.

Figure 4:
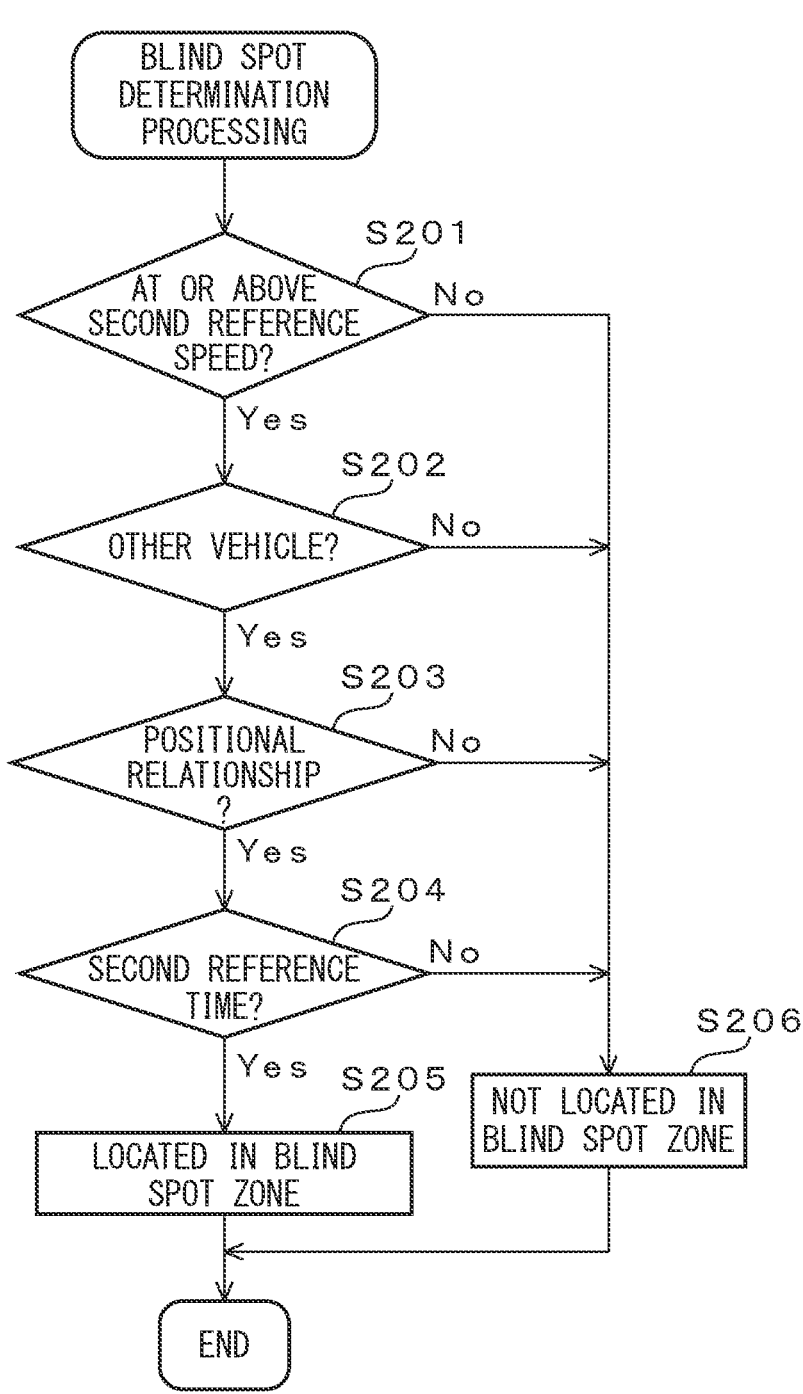
FIG. 4 is an example of an operation flow chart for blind spot determination processing by the drive planning device of the first embodiment.

FIG. 4 is an example of an operation flow chart for blind spot determination processing by the drive planning device of the embodiment. The drive planning device 15 carries out blind spot determination processing according to the operation flow chart shown in FIG. 4, at a blind spot determination time having a predetermined cycle. The determination by the determining unit 232 in step S101 is based on the determination results of blind spot determination processing executed according to the operation flow chart shown in FIG. 4.

First, the determining unit 232 determines whether or not the speed of the vehicle 10 is at or above a second reference speed (step S201). The determining unit 232 calculates the speed of the vehicle 10 based on speed information. For example, the determining unit 232 calculates the speed of the vehicle 10 to be the nearest average speed (for example, the average speed during 5 seconds), based on vehicle speed information. The second reference speed may be between 50 km/hr and 60 km/hr. The determining unit 232 may also determine whether or not the speed of the vehicle 10 is within a reference speed range.

When the speed of the vehicle 10 is at or above the second reference speed (step S201—Yes), the determining unit 232 determines whether or not another vehicle is located in an adjacent lane which is adjacent to the traffic lane in which the vehicle 10 is traveling, within a predetermined range from the current location of the vehicle 10 (step S202). The predetermined range may be 10 m, for example. The determining unit 232 acquires the current location of the vehicle 10 from the location estimating device 12. The determining unit 232 ascertains the locations of other vehicles in adjacent lanes based on object detection information.

When another vehicle is located in an adjacent lane (step S202—Yes), the determining unit 232 determines whether or not the positional relationship between the vehicle 10 and the other vehicle in the adjacent lane satisfies a predetermined relationship (step S203). The determining unit 232 determines that the predetermined relationship is satisfied when the location of the front end of the vehicle 10 is within a predetermined range with respect to the location of the back end of the other vehicle, in the traveling direction of the vehicle 10. The determining unit 232 calculates the location of the front end of the vehicle 10 based on the current location of the vehicle 10 (for example, the location of the center of gravity of the vehicle 10), and the distance between the center of gravity and front end of the vehicle 10. The distance between the center of gravity and the front end of the vehicle 10 is stored in the memory 22. The determining unit 232 also ascertains the locations of the back ends of other vehicles based on object detection information.

In the example shown in FIG. 1A, the range of the distance L ahead and behind the location of the back end of the vehicle 60 along the traveling direction of the vehicle 10 is the blind spot zone D of the vehicle 10. Since the location of the front end of the vehicle 10 is within the range of the distance L with respect to the location of the back end of the vehicle 60 in the adjacent traffic lane 52 in the traveling direction of the vehicle 10, the determining unit 232 determines that the predetermined relationship is satisfied.

When the positional relationship satisfies the predetermined relationship (step S203—Yes), the determining unit 232 determines whether or not the predetermined second reference time period has elapsed with the positional relationship satisfying the predetermined relationship (step S204). The second reference time period may be 7 seconds, for example. The cycle for the blind spot determination time is preferably shorter than the second reference time period. In this case, after it has been most recently determined that the vehicle 10 is not located in the blind spot zone, the determining unit 232 determines whether or not the time elapsed from the time point at which it was first determined that the positional relationship satisfies the predetermined relationship, is longer than the second reference time period.

When the second reference time period has elapsed (step S204—Yes), the determining unit 232 determines that the vehicle 10 is located in the blind spot zone of the other vehicle (step S205), and the series of processing steps is complete.

Conversely, when the speed of the vehicle 10 is below the second reference speed (step S201—No), when no other vehicle is located in an adjacent lane (step S202—No), when the positional relationship does not satisfy the predetermined relationship (step S203—No) or when the second reference time period has not elapsed (step S204—No), the determining unit 232 determines that the vehicle 10 is not located in a blind spot zone of another vehicle (step S206), and the series of processing steps is complete. This completes explanation of blind spot determination processing.

Figure 5:
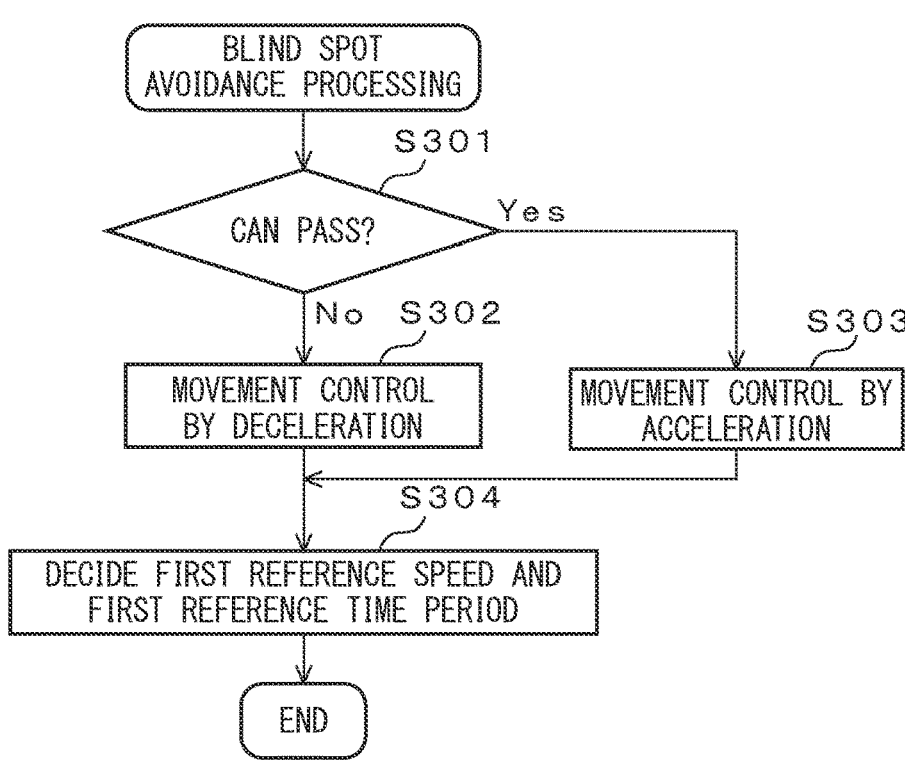
FIG. 5 is an example of an operation flow chart for blind spot avoidance processing by the drive planning device of the first embodiment.

FIG. 5 is an example of an operation flow chart for blind spot avoidance processing by the drive planning device 15 of the embodiment. In step S102 described above, the drive planning device 15 carries out blind spot avoidance processing according to the operation flow chart shown in FIG. 5.

First, the determining unit 232 determines whether or not the vehicle 10 can pass another vehicle traveling in an adjacent lane (step S301). For example, the determining unit 232 determines whether or not the set speed of the vehicle 10 is faster than the speed of the other vehicle traveling in the adjacent lane. Based on object detection information, the determining unit 232 ascertains the speed of other vehicles traveling in adjacent lanes. The most recent average speed of the vehicle 10 (such as the average speed during 5 seconds) may also be used, instead of a set speed.

When the set speed of the vehicle 10 is faster than the speed of the other vehicle, the determining unit 232 determines whether or not a predetermined reference distance can be ensured between the vehicle 10 and another vehicle in a traveling lane in which the vehicle 10 is traveling, while the vehicle 10 passes the other vehicle traveling in the adjacent lane.

The determining unit 232 estimates the location of the other vehicle at the point at which the vehicle 10 has passed the other vehicle traveling in the adjacent lane. The determining unit 232 estimates the time required for the vehicle 10 to pass the other vehicle traveling in the adjacent lane, and estimates the location of the other vehicle at the point where the estimated time has elapsed.

The determining unit 232 estimates the clearance between the location of the vehicle 10 at the point at which the vehicle 10 has passed the other vehicle traveling in the adjacent lane, and the location of the other vehicle. When the distance between the vehicle 10 and the other vehicle traveling in the adjacent lane in the traveling direction of the vehicle 10 is at least a predetermined distance (such as 35 m), the determining unit 232 determines that the vehicle 10 is able to pass the other vehicle traveling in the adjacent lane. When the distance between the vehicle 10 and the other vehicle traveling in the adjacent lane in the traveling direction of the vehicle 10 is less than the predetermined distance, on the other hand, the determining unit 232 determines that the vehicle 10 is not able to pass the other vehicle traveling in the adjacent lane. When the set speed of the vehicle 10 is not faster than the speed of the other vehicle, the determining unit 232 likewise determines that the vehicle 10 is not able to pass the other vehicle traveling in the adjacent lane.

When it is not able to pass (step S301—No), the deciding unit 233 decides to initiate the movement control by decelerating the vehicle 10 (step S302). The deciding unit 233 notifies the planning unit 231 that the movement control is to be initiated. The planning unit 231 creates a driving plan so as to execute the movement control. With the movement control, the planning unit 231 creates a driving plan so as to decelerate the vehicle 10 to move the vehicle 10 from the blind spot zone of the other vehicle in the adjacent lane to a location outside of the blind spot zone, and to cause the vehicle 10 to follow while opening a space of a predetermined distance (such as 7 m) behind the other vehicle, along the traveling direction of the vehicle 10. The planning unit 231 thus allows the vehicle 10 to move from out of the blind spot zone of the other vehicle, thereby preventing the vehicle 10 from being located in the blind spot zone again.

The deciding unit 233 then decides the first reference speed and first reference time period (step S304), and the series of processing steps is complete. The first reference speed and first reference time period are used in the speed determination processing of step S103. The first reference speed may also be a predetermined value (such as 1 km/hr). The deciding unit 233 may also decide the first reference speed based on the speed of the vehicle 10 at the point when it has been decided to initiate the movement control. In this case, the deciding unit 233 may set a larger first reference speed for a faster speed of the vehicle 10.

The deciding unit 233 preferably also decides the first reference time period so that it is shorter for a greater first reference speed. When the difference between the speed of the vehicle 10 and the first reference speed is 1 km/hr, for example, the first reference time period may be set to 33 seconds, and when the difference between the speed of the vehicle 10 and the first reference speed is 2 km/hr, the first reference time period may be set to 30 seconds. When another vehicle is traveling ahead of the vehicle 10 on the traveling lane on which the vehicle 10 is traveling, a high first reference speed causes the distance between the vehicle 10 and the other vehicle ahead to increase during the time until the first reference time period elapses. With a large distance between the vehicle 10 and the other vehicle ahead, the driver may not be satisfied with operation of the vehicle 10. The first reference time period is therefore decided so that it is shorter for a greater first reference speed. The deciding unit 233 is an example of the third deciding unit.

When passing is possible (step S301—Yes), on the other hand, the deciding unit 233 decides to initiate the movement control by accelerating the vehicle 10 (step S303), and processing proceeds to step S304. The deciding unit 233 notifies the planning unit 231 that the movement control is to be initiated. The planning unit 231 creates a driving plan so as to execute the movement control. With the movement control, the planning unit 231 creates a driving plan to move the vehicle 10 from the blind spot zone of the other vehicle in the adjacent lane to a location outside of the blind spot zone at the set speed. The planning unit 231 moves the vehicle 10 out from the blind spot zone of the other vehicle. This completes explanation of blind spot avoidance processing.

Figure 6:
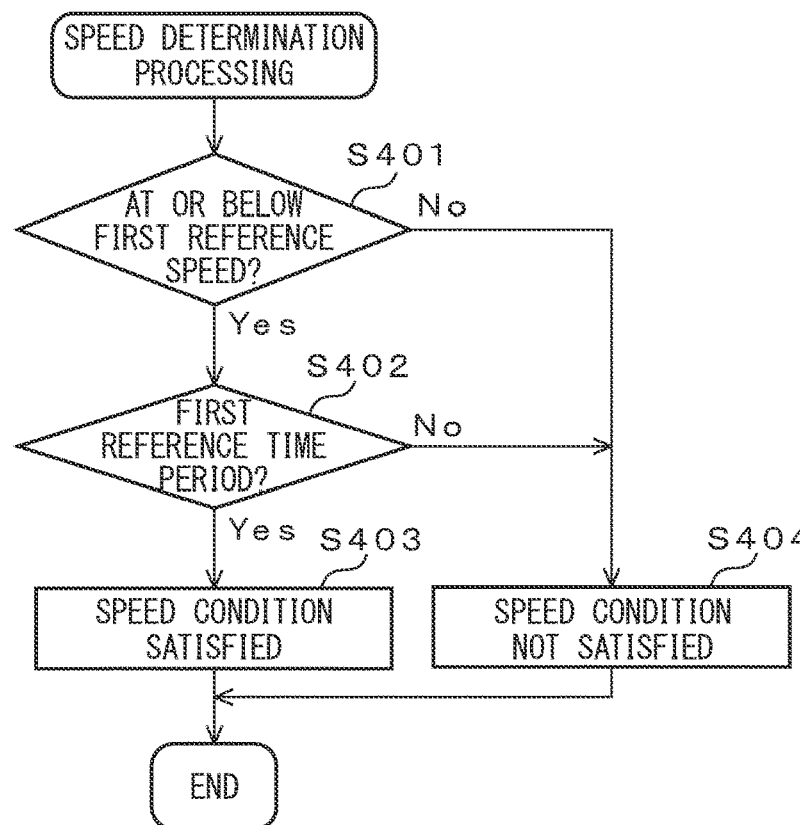
FIG. 6 is an example of an operation flow chart for speed determination processing by the drive planning device of the first embodiment.

FIG. 6 is an example of an operation flow chart for speed determination processing by the drive planning device 15 of the embodiment. In step S103 described above, the drive planning device 15 carries out speed determination processing according to the operation flow chart shown in FIG. 6.

First, the determining unit 232 determines whether or not the absolute value of the relative speed between the vehicle 10 and the other vehicle in an adjacent lane is at or below the first reference speed (step S401). The determining unit 232 calculates the speed of the vehicle 10 based on speed information. For example, the determining unit 232 calculates the speed of the vehicle 10 to be the nearest average speed (for example, the average speed during 5 seconds), based on vehicle speed information. Based on object detection information, the determining unit 232 also calculates the most recent average speed of the other vehicle in the adjacent lane (for example, the average speed during 5 seconds), as the speed of the other vehicle. The determining unit 232 calculates the absolute value of the relative speed between the speed of the vehicle 10 and the speed of the other vehicle.

When the absolute value of the relative speed is at or below the first reference speed (step S401—Yes), the determining unit 232 determines whether or not the state at or below the first reference speed has continued for the first reference time period (step S402). The determining unit 232 may then determine whether or not the state in which the average value for the absolute value of the relative speed is at or below the first reference speed, has continued for the first reference time period.

When the state at or below the first reference speed has continued for the first reference time period (step S402—Yes), the deciding unit 233 decides that the speed condition is satisfied (step S403), and the series of processing steps is complete. That the speed condition is satisfied means that the state at or below the first reference speed continues for the first reference time period.

When the state at or below the second reference speed has not continued for the first reference time period (step S402—No), or the absolute value of the relative speed is not at or below the first reference speed (step S401—No), the deciding unit 233 decides that the speed condition is not satisfied (step S404), and the series of processing steps is complete. That the speed condition is not satisfied means that the state at or below the first reference speed does not continue for the first reference time period.

The speed determination processing described above will now be explained with reference to FIG. 1B. In the example shown in FIG. 1B, when the vehicle 10 is to be decelerated during the movement control, the planning unit 231 generates a driving plan so that the amount of deceleration does not exceed the maximum deceleration amount vm. In other words, for the speed of the vehicle 10 with the movement control, deceleration is avoided that would exceed the maximum deceleration amount vm with respect to the speed vs at the point where the movement control was initiated.

At time t1, the drive planning device 15 has determined that the vehicle 10 is located in a blind spot zone D of the vehicle 60, and has decided to initiate the movement control of the vehicle 10 so that the vehicle 10 is decelerated and moves behind the blind spot zone D of the vehicle 60.

The drive planning device 15 decides the first reference time period tr1 (such as 33 seconds) and the first reference speed dv1 (such as 1 km/hr). The drive planning device 15 may also decide the first reference time period tr1 based on the maximum deceleration amount vm and the first reference speed dv1. For example, the first reference time period tr1 is decided based on the quotient of the maximum deceleration amount vm divided by the first reference speed dv1. The vehicle control device 16 controls the vehicle 10 based on a driving plan created by the drive planning device 15 which includes the movement control.

After the vehicle 10 has initiated the movement control, the vehicle 60 was changed to speed v2, similar to the vehicle 10. The vehicle 10 therefore continues to be located in the blind spot zone D of the vehicle 60, even though the movement control was executed.

As shown in FIG. 1B, the drive planning device 15 has generated a driving plan to reduce the speed v1 of the vehicle 10 from a speed vs only to a maximum deceleration amount vm at time t1, after which it will travel at speed vt. However, the vehicle 10 was located in the blind spot zone D of the vehicle 60. The drive planning device 15 also generated a driving plan for traveling at speed vt.

The drive planning device 15 has therefore determined that the absolute value of the relative speed between the vehicle 10 and vehicle 60 (v2-v1) is at or below the first reference speed dv1, at time t2 while the movement control is being executed.

Since a state in which the absolute value of the relative speed between the vehicle 10 and vehicle 60 is at or below the first reference speed dv1 has continued for a first reference time period tr1 at time t3, the drive planning device 15 decided to end the movement control.

The drive planning device 15 generates a driving plan for the speed of the vehicle 10 so that the vehicle 10 travels at a driver-set speed. The vehicle 10 accelerates and passes the vehicle 60, moving from the blind spot zone D of the vehicle 60 to a location outside of the blind spot zone D.

The speed determination processing described above will now be explained with reference to FIG. 7. In the example shown in FIG. 7, when the vehicle 10 is to be decelerated during the movement control, the planning unit 231 generates a driving plan without limit to the amount of deceleration.

As shown in FIG. 1A, the drive planning device 15 has determined that the vehicle 10 is located in the blind spot zone D of the vehicle 60, and at time t1, has decided to initiate the movement control of the vehicle 10 so that the vehicle 10 is decelerated and moves behind the blind spot zone D of the vehicle 60.

The drive planning device 15 decides the first reference time period tr2 (such as 30 seconds) and the first reference speed dv2 (such as 2 km/hr). When there is no limit to the amount of deceleration for the movement control, the drive planning device 15 preferably decides the first reference speed dv2 to be greater than when there is a limit to the amount of deceleration for the movement control. The first reference speed dv2 is therefore greater than the first reference speed dv1 mentioned above. As a result, the drive planning device 15 can decelerate the vehicle 10 more to facilitate its movement out of the blind spot zone D.

Moreover, since the first reference time period tr2 is decided so as to be shorter with a greater first reference speed dv2, the first reference time period tr2 is shorter than the first reference time period tr1 mentioned above. The time during which the vehicle 10 is located in the blind spot zone D during the movement control can thereby be shortened, helping to reduce driver discomfort during operation of the vehicle 10.

Figure 7:
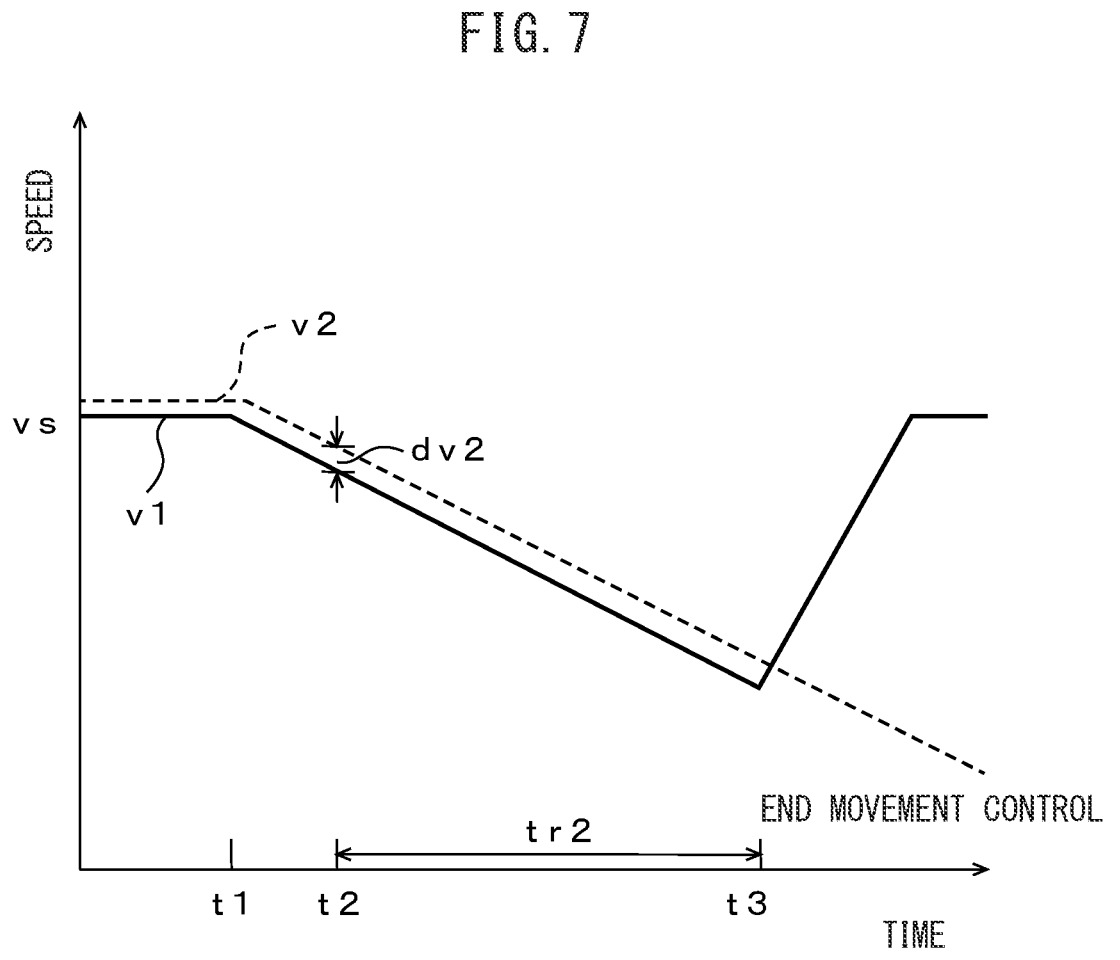

As shown in FIG. 7, the drive planning device 15 has generated a driving plan which includes the movement control by reducing the speed v1 of the vehicle 10.

After the vehicle 10 has initiated the movement control, the vehicle 60 was changed to speed v2, similar to the vehicle 10. The vehicle 10 therefore continues to be located in the blind spot zone D of the vehicle 60, even though the movement control was executed.

The drive planning device 15 has determined that the absolute value of the relative speed between the vehicle 10 and vehicle 60 (v2-v1) is at or below the first reference speed dv2, at time t2 while the movement control is being executed.

Since a state in which the absolute value of the relative speed between the vehicle 10 and vehicle 60 is at or below the first reference speed dv2 has continued for the first reference time period tr2 at time t3, the drive planning device 15 decides to end the movement control.

The drive planning device 15 generates a driving plan for the speed of the vehicle 10 so that the vehicle 10 travels at a driver-set speed. The vehicle 10 accelerates and passes the vehicle 60, moving from the blind spot zone D of the vehicle 60 to a location outside of the blind spot zone D.

Although the movement control was by deceleration of the vehicle 10 in the examples shown in FIG. 1B and FIG. 7, the movement control may also be by acceleration of the vehicle 10.

As explained above, the drive planning device of the embodiment ends the movement control when, after the movement control has been initiated to move the vehicle to a location outside of a blind spot zone of a vehicle by changing the speed of the vehicle, the vehicle continues to have a small relative speed with respect to the other vehicle while remaining located in the blind spot zone. This allows the vehicle to accelerate or decelerate to move out of the blind spot zone. Since the drive planning device of this embodiment ends the movement control when a state in which the absolute value of the relative speed between the vehicle and the other vehicle is at or below a reference speed has continued for a reference time period, it is possible to prevent the vehicle from being located too long in a blind spot zone, and to thus increase safety for the vehicle.

Modified example 1 to modified example 3 of the drive planning device 15 of the first embodiment will now be described with reference to FIG. 8 to FIG. 10.

FIG. 8 is an example of an operation flow chart for speed determination processing according to modified example 1, by the drive planning device of the first embodiment. This modified example differs from the speed determination processing shown in FIG. 6 in that the processing of step S503 is added. The processing in steps S501 to S502, S504 and S505 are the same as in steps S401 to S404 described above.

For this modified example, when a state at or below the first reference speed has continued for the first reference time period (step S502—Yes), the determining unit 232 determines whether or not the driver is gripping the steering wheel 32 (step S503). For example, the determining unit 232 may determine that the driver is gripping the steering wheel 32 when a grip signal indicating that the driver is gripping the steering wheel 32 has been input into the drive planning device 15. Conversely, the determining unit 232 may determine that the driver is not gripping the steering wheel 32 when a grip signal has not been input into the drive planning device 15.

When the driver is gripping the steering wheel 32 (step S503—Yes), processing proceeds to step S504. When the driver is not gripping the steering wheel 32 (step S503—No), processing proceeds to step S505.

A condition in which the vehicle 10 continues to remain in a blind spot zone of another vehicle even though the vehicle 10 is being controlled to move the vehicle 10 from the blind spot zone to a location outside of the blind spot zone, is in a sense a condition of difficulty in self-driving of the vehicle 10.

When the driver is gripping the steering wheel 32, it may be assumed that the driver recognizes the current condition of the vehicle 10.

By ending the movement control after having confirmed that the driver recognizes the current condition of the vehicle 10, it is possible to continue operation of the vehicle 10 in self-driving mode with operation of the vehicle 10 being monitored by the driver.

In the modified example described above, the drive planning device 15 can end the movement control and continue operation of the vehicle 10 in self-driving mode while the driver is monitoring. In this modified example, the drive planning device 15 exhibits the same effect as described above for the first embodiment.

Figure 9:
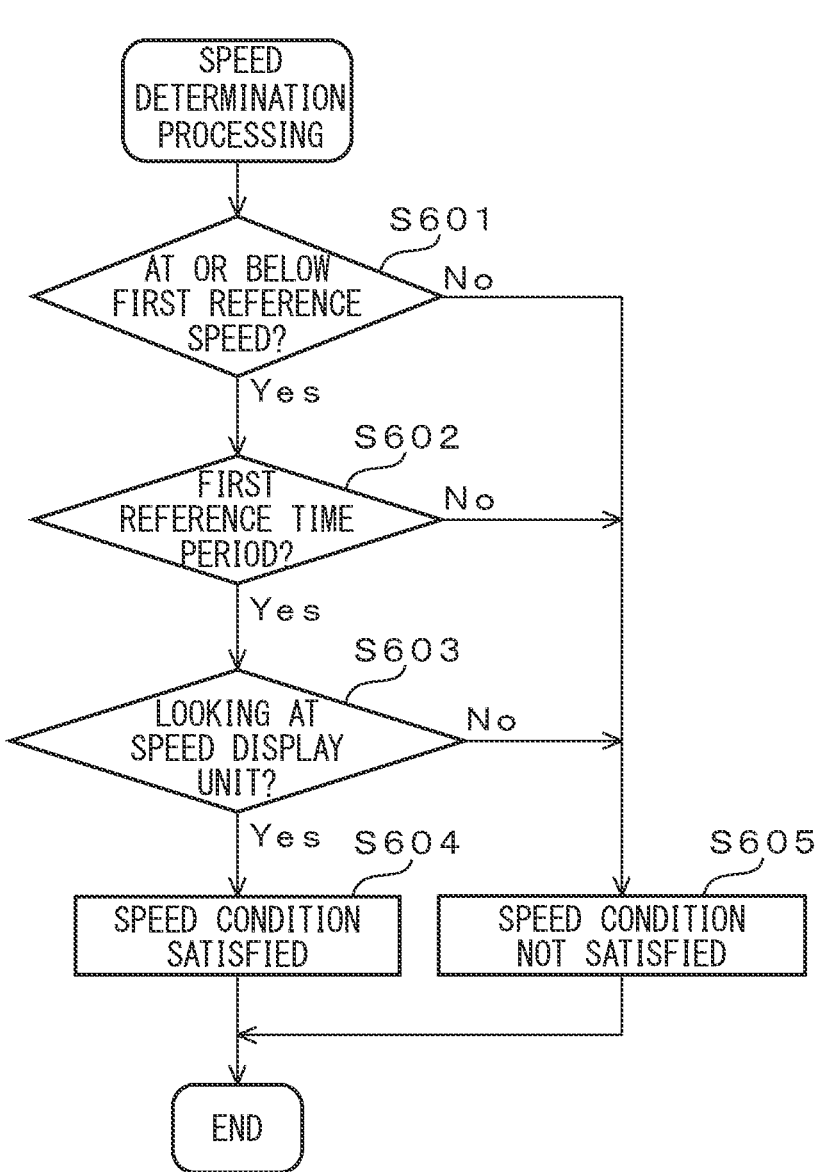
FIG. 9 is an example of an operation flow chart for speed determination processing according to modified example 2, by the drive planning device of the first embodiment.

FIG. 9 is an example of an operation flow chart for speed determination processing according to modified example 2, by the drive planning device of the first embodiment. This modified example differs from the speed determination processing shown in FIG. 6 in that the processing of step S603 is added. The processing in steps S601 to S602, S604 and S605 are the same as in steps S401 to S404 described above.

For this modified example, when a state at or below the first reference speed has continued for the first reference time period (step S602—Yes), the determining unit 232 determines whether or not the driver is looking at the speed display unit (not shown) (step S603). Incidentally, the UI 6 may also be a speed display unit.

The determining unit 232 estimates the direction of the line of sight of the driver based on a facial image taken by the monitoring camera 7. The gaze position of the driver is estimated based on the direction of the line of sight. When a condition in which the gaze position of the driver aligns with the speed display unit continues for a predetermined period of time (such as 5 seconds), the determining unit 232 determines that the driver is looking at the speed display unit. The method of estimating the gaze position based on the facial image may be any publicly known method.

When the driver is looking at the speed display unit (step S603—Yes), processing proceeds to step S604. When the driver is not looking at the speed display unit (step S603—No), processing proceeds to step S605.

A condition in which the vehicle 10 continues to remain in a blind spot zone of another vehicle even though the vehicle 10 is being controlled to move the vehicle 10 from the blind spot zone to a location outside of the blind spot zone, is in a sense a condition of difficulty in self-driving of the vehicle 10.

When the driver is looking at the speed display unit, it may be assumed that the driver recognizes the current condition of the vehicle 10.

By ending the movement control after having confirmed that the driver recognizes the current condition of the vehicle 10, it is possible to continue operation of the vehicle 10 in self-driving mode with operation of the vehicle 10 being monitored by the driver.

In the modified example described above, the drive planning device 15 can end the movement control and continue operation of the vehicle 10 in self-driving mode while the driver is monitoring. In this modified example, the drive planning device 15 exhibits the same effect as described above for the first embodiment.

Figure 10:
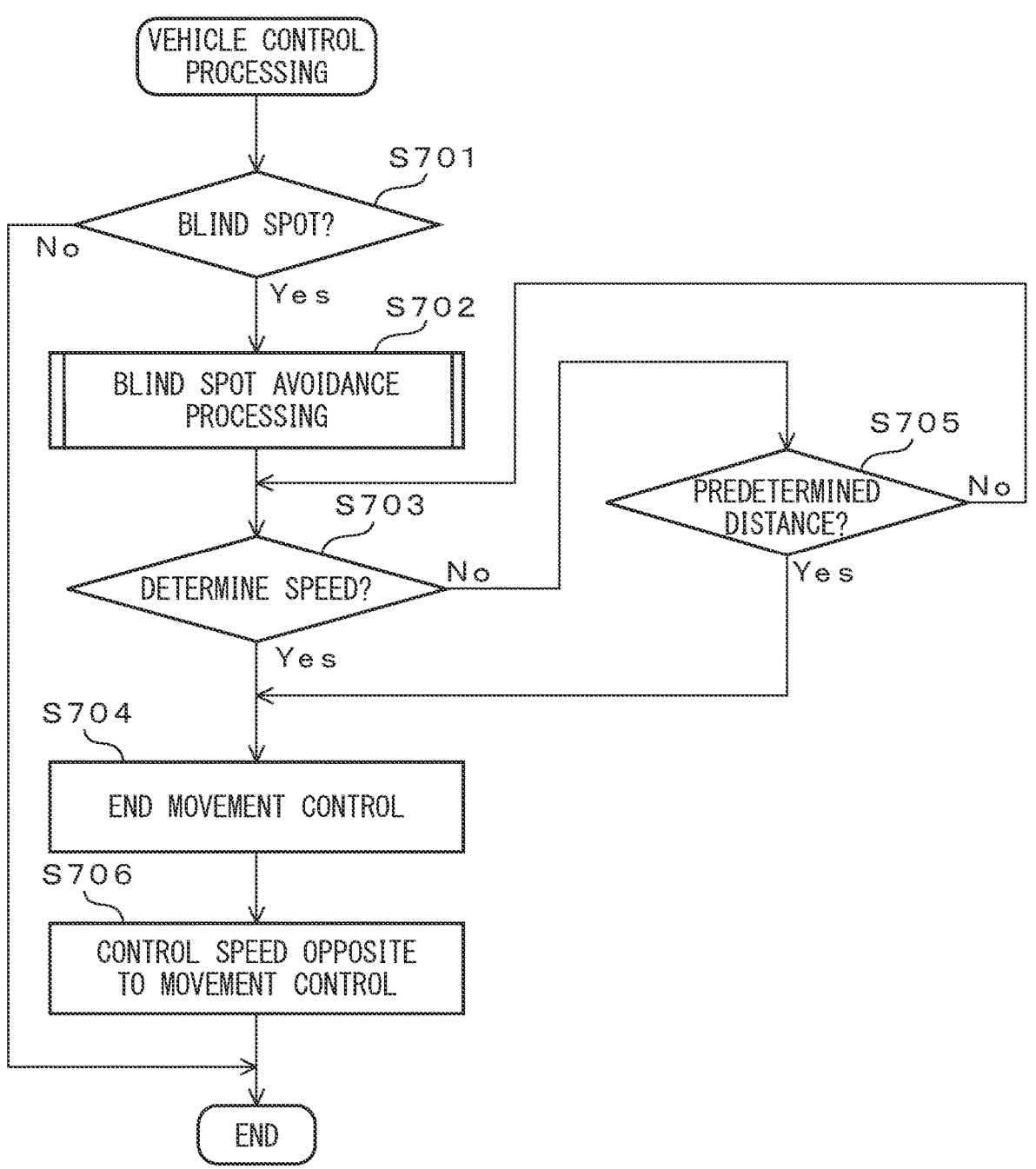
FIG. 10 is an example of an operation flow chart for vehicle control processing according to modified example 3, by the drive planning device of the first embodiment.

FIG. 10 is an example of an operation flow chart for vehicle control processing according to modified example 3, by the drive planning device of the first embodiment. This modified example differs from the vehicle control processing shown in FIG. 3 in that the processing of step S706 is added. The processing in steps S701 to S705 are the same as in steps S101 to S105 described above.

For this modified example, after it has been decided to end the movement control (step S704), the deciding unit 233 decides to control the speed of the vehicle so that the vehicle 10 is accelerated or decelerated in the direction opposite from the direction in which the speed of the vehicle 10 has changed by the movement control (this opposite direction will hereunder also be referred to as "control-opposite direction") (step S706). The deciding unit 233 is an example of the fifth deciding unit.

At the point when it has been decided to end the movement control, the vehicle 10 is located in a blind spot zone of another vehicle. Preferably, then, the vehicle 10 is rapidly moved from the blind spot zone to a location outside of the blind spot zone.

Since the other vehicle in an adjacent lane moves in the same direction as the direction in which the speed of the vehicle 10 was changed by the movement control, it may be possible to rapidly move the vehicle 10 out from the blind spot zone by acceleration or deceleration of the vehicle 10 in the control-opposite direction.

The deciding unit 233 notifies the planning unit 231 that the speed of the vehicle is to be controlled so that the vehicle 10 is accelerated or decelerated in the control-opposite direction. The planning unit 231 then generates a driving plan to accelerate or decelerate the vehicle 10 in the control-opposite direction. For example, the planning unit 231 generates a driving plan to accelerate to a set speed out of the blind spot zone.

According to the modified example described above, the drive planning device 15 can rapidly move the vehicle 10 from the blind spot zone to a location outside of the blind spot zone after it has been decided to end the movement control. In this modified example, the drive planning device 15 exhibits the same effect as described above for the first embodiment.

Figure 11:
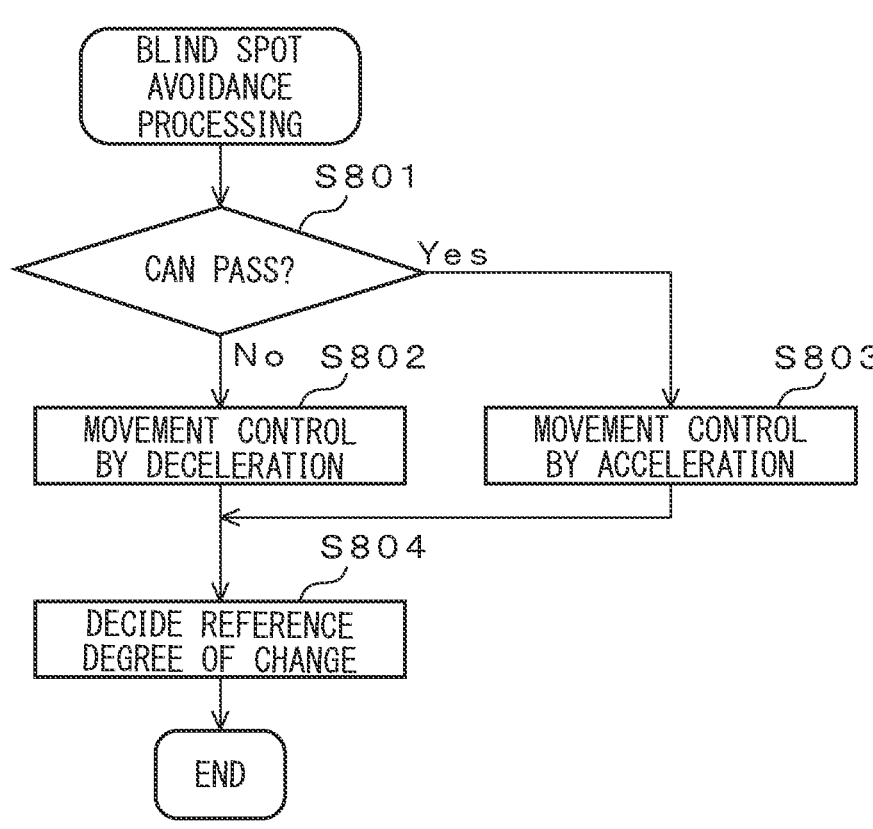
FIG. 11 is an example of an operation flow chart for blind spot avoidance processing by the drive planning device according to a second embodiment.

A second embodiment of the drive planning device of the disclosure will now be described with reference to FIG. 11 to FIG. 13. The explanation of the first embodiment is to be applied for any aspects of the second embodiment that are not explained here.

This embodiment differs from the first embodiment in that during the speed determination processing of step S103 for the vehicle control processing shown in FIG. 3, it is determined by the determining unit 232 whether or not the degree of change in the speed of the vehicle 10 has reached the predetermined reference degree of change.

When the degree of change in the speed of the vehicle 10 has reached the predetermined reference degree of change (step S103—Yes), the deciding unit 233 decides to end the movement control (step S104), and the series of processing steps is complete. The deciding unit 233 is an example of the second deciding unit.

When the degree of change in the speed of the vehicle 10 has not reached the predetermined reference degree of change (step S103—No), the determining unit 232 determines whether or not the location of the vehicle 10 is separated by a predetermined distance from the other vehicle (step S105).

The reference degree of change is decided during the blind spot avoidance processing. FIG. 11 is an example of an operation flow chart for blind spot avoidance processing by the drive planning device 15 of the second embodiment.

The processing in step S804 of this embodiment differs from step S304 of the blind spot avoidance processing shown in FIG. 5. The processing in steps S801 to S803 are the same as in steps S301 to S303 described above.

For this embodiment, the deciding unit 233 decides the reference degree of change (step S804), and the series of processing steps is complete. The reference degree of change is used in the speed determination processing of step S103. The reference degree of change may also be a predetermined value (such as 10.0 km/hr). The deciding unit 233 may also decide the reference degree of change based on the speed of the vehicle 10 at the point when it has been decided to initiate the movement control. In this case, the deciding unit 233 may set a smaller reference degree of change for a faster speed of the vehicle 10.

When another vehicle is traveling ahead of the vehicle 10 on the traveling lane in which the vehicle 10 is traveling, a large reference degree of change causes the distance between the vehicle 10 and the other vehicle ahead to increase during the time until the degree of change in the speed of the vehicle 10 reaches the reference degree of change. A faster speed of the vehicle 10 at the point when it has been decided to initiate the movement control results in a greater distance between the vehicle 10 and the other vehicle ahead. The reference degree of change is therefore decided so as to be smaller for a faster speed of the vehicle 10 at the point when it has been decided to initiate the movement control. The deciding unit 233 is an example of the fourth deciding unit.

Figure 12:
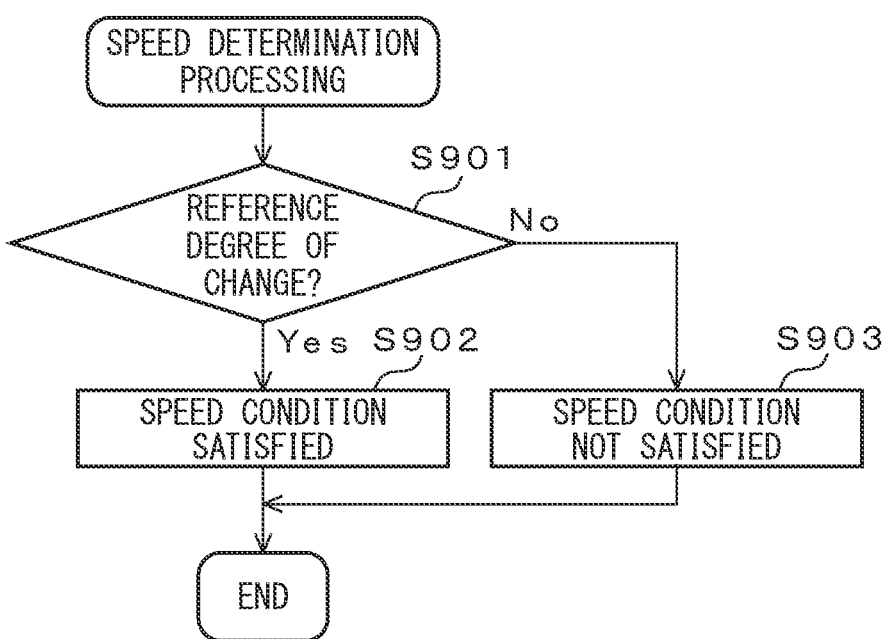
FIG. 12 is an example of an operation flow chart for speed determination processing by the drive planning device of the second embodiment.

FIG. 12 is an example of an operation flow chart for speed determination processing by the drive planning device 15 of the second embodiment. For this embodiment, steps S401 and S402 of the speed determination processing shown in FIG. 6 are replaced by step S901. The processing in steps S902 and S903 is the same as the processing in steps S403 and S404.

For this embodiment, the determining unit 232 determines whether or not the degree of change in the speed of the vehicle 10 has reached the predetermined reference degree of change (step S901). For example, the determining unit 232 calculates the absolute value of the change in speed as the difference between the current speed of the vehicle 10 and the speed of the vehicle 10 at the point at which the movement control was initiated (hereunder also referred to as "first speed"). The determining unit 232 calculates the first speed to be the average speed (for example, the average speed for 5 seconds) at the point where the movement control was initiated.

The determining unit 232 also calculates the most recent average speed (for example, the average speed during 5 seconds), as the current speed of the vehicle 10 (hereunder also referred to as "second speed"). The determining unit 232 calculates the absolute value of the difference between the first speed and the second speed, as the degree of change in the speed of the vehicle 10. The determining unit 232 determines whether or not the degree of change in the speed has reached the reference degree of change.

When the degree of change in the speed of the vehicle 10 has reached the reference degree of change (step S901—Yes), processing proceeds to step S902. When the degree of change in the speed of the vehicle 10 has not reached the reference degree of change (step S901—No), processing proceeds to step S903.

The speed determination processing described above will now be explained with reference to FIG. 13. In the example shown in FIG. 13, when the vehicle 10 is to be decelerated during the movement control, the planning unit 231 generates a driving plan without limit to the amount of deceleration.

As shown in FIG. 1A, the drive planning device 15 has determined that the vehicle 10 is located in the blind spot zone D of the vehicle 60, and at time t1, has decided to initiate the movement control of the vehicle 10 so that the vehicle 10 is decelerated and moves behind the blind spot zone D of the vehicle 60.

The drive planning device 15 decides the reference degree of change dv3 (for example, 10.0 km/hr). As shown in FIG. 13, the drive planning device 15 has generated a driving plan which includes the movement control by reducing the speed v1 of the vehicle 10.

After the vehicle 10 has initiated the movement control, the vehicle 60 was changed to speed v2, similar to the vehicle 10. The vehicle 10 therefore continues to be located in the blind spot zone D of the vehicle 60, even though the movement control was executed.

Since the drive planning device 15 has determined that the degree of change in the speed of the vehicle 10 has reached the predetermined reference degree of change dv3 at time t2 while the movement control is being executed, the drive planning device 15 decides to end the movement control.

The drive planning device 15 generates a driving plan for the speed of the vehicle 10 so that the vehicle 10 travels at a driver-set speed. The vehicle 10 accelerates and passes the vehicle 60, moving from the blind spot zone D of the vehicle 60 to a location outside of the blind spot zone D.

Figure 13:
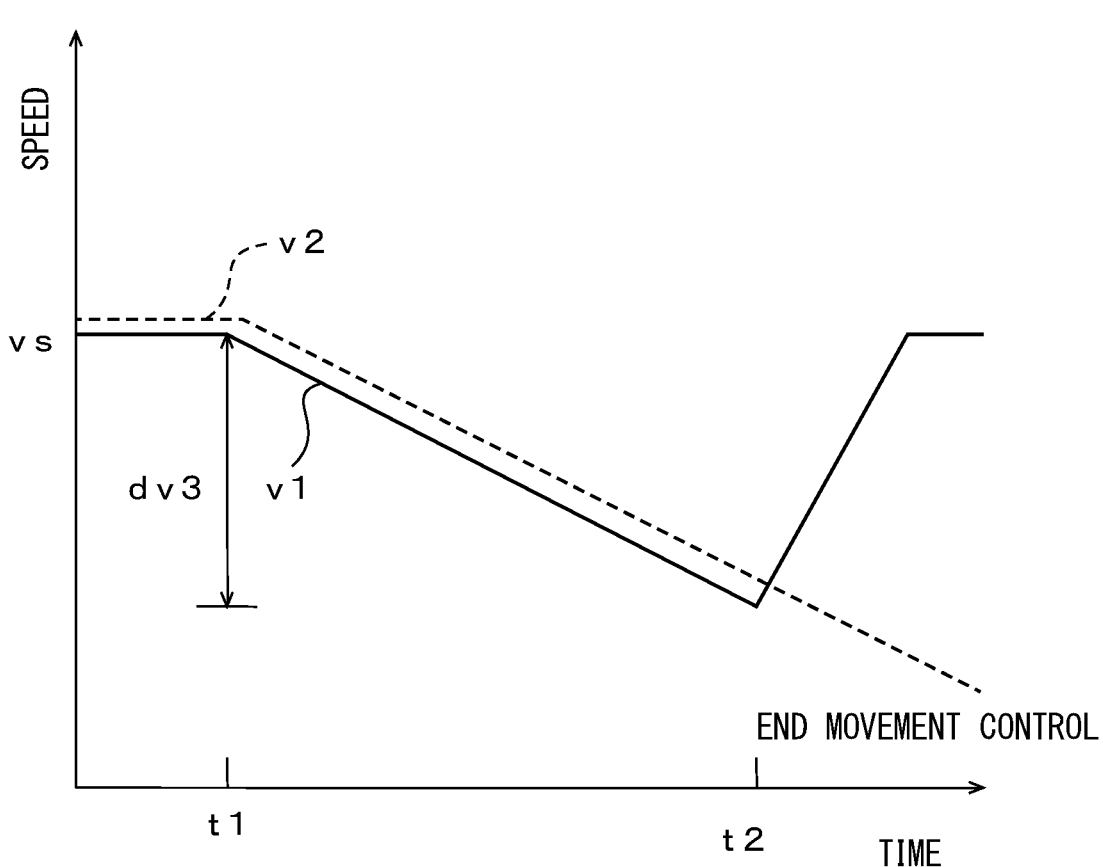
FIG. 13 is a diagram showing yet another example of the relationship between speed and time.

Although the movement control is by deceleration of the vehicle 10 in the example shown in FIG. 13, the movement control may also be by acceleration of the vehicle 10.

As explained above, the drive planning device of the embodiment ends the movement control when, after the movement control has been initiated to move the vehicle to a location outside of a blind spot zone of a vehicle by changing the speed of the vehicle, the vehicle continues to have a small relative speed with respect to the other vehicle while remaining located in the blind spot zone. This allows the vehicle to be accelerated or decelerated to move out of the blind spot zone. Since the drive planning device of the embodiment ends the movement control when the degree of change in the speed of the vehicle has reached the reference degree of change, it is possible to execute operation of the vehicle to match the sensation of the driver in response to change in the speed of the vehicle.

A modified example of the drive planning device of the second embodiment will now be described with reference to FIG. 14. FIG. 14 is an example of an operation flow chart for speed determination processing according to a modified example of the drive planning device of the second embodiment.

In this modified example, the speed determination processing is a combination of the speed determination processing of the first embodiment and the speed determination processing of the second embodiment.

This modified example differs from the speed determination processing shown in FIG. 12 in that steps S1001 and S1002 are added. Steps S1001 and S1002 are the same as steps S401 and S402 of the speed determination processing shown in FIG. 6.

First, the determining unit 232 determines whether or not the absolute value of the relative speed between the vehicle 10 and the other vehicle in an adjacent lane is at or below the first reference speed (step S1001).

When the absolute value of the relative speed is at or below the first reference speed (step S1001—Yes), the determining unit 232 determines whether or not the state at or below the first reference speed has continued for the first reference time period (step S1002).

When a state at or below the first reference speed has continued for the first reference time period (step S1002—Yes), the deciding unit 233 decides that the speed condition is satisfied (step S1003), and the series of processing steps is complete.

When a state at or below the second reference speed has not continued for the first reference time period (step S1002—No), or the absolute value of the relative speed is not at or below the first reference speed (step S1001—No), the determining unit 232 determines whether or not the degree of change in the speed of the vehicle 10 has reached the predetermined reference degree of change (step S1004).

When the degree of change in the speed of the vehicle 10 has reached the reference degree of change (step S1004—Yes), processing proceeds to step S1003. When the degree of change in the speed of the vehicle 10 has not reached the predetermined reference degree of change (step S1004—No), the deciding unit 233 decides that satisfy the speed condition is not satisfied (step S1005), and the series of processing steps is complete.

Since the drive planning device of this modified example ends the movement control when a state in which the absolute value of the relative speed between the vehicle and the other vehicle is at or below a reference speed has continued for a reference time period, it is possible to prevent the vehicle from being located too long in a blind spot zone, and to thus increase safety for the vehicle. Moreover, since the drive planning device of this modified example ends the movement control when the degree of change in the speed of the vehicle has reached the reference degree of change, it can easily execute operation of the vehicle to match the sensation of the driver in response to change in the speed of the vehicle. The drive planning device of this modified example exhibits the same effect the drive planning device of the second embodiment.

The vehicle control device, the computer program for vehicle control and the method for controlling a vehicle according to the embodiments described above may incorporate appropriate modifications that are still within the gist of the disclosure. Moreover, the technical scope of the disclosure is not limited to these embodiments, and includes the invention and its equivalents as laid out in the Claims.

For example, in the speed determination processing of the second embodiment, the determining unit may determine both whether or not the driver is gripping the steering wheel or the driver is looking at the speed display unit, and whether or not the degree of change in the speed of the host vehicle has reached a predetermined reference degree of change.

Also, in the vehicle control processing of the second embodiment, when it has been decided to end the movement control, the deciding unit may decide to control the speed of the vehicle so that the vehicle is accelerated or decelerated in the direction opposite from the direction in which the speed of the vehicle has changed by the movement control.

The invention claimed is:

1. A vehicle control device comprising:
   a processor configured to
   determine whether a host vehicle is located in a blind spot zone of another vehicle based on information representing environment surrounding the host vehicle,
   initiate movement control to cause movement of the host vehicle from the blind spot zone of the other vehicle to a location outside of the blind spot zone by changing speed of the host vehicle when the host vehicle has been determined to be located in the blind spot zone of the other vehicle,
   determine whether a state in which an absolute value of relative speed between the host vehicle and the other vehicle is at or below a predetermined reference speed has continued for a predetermined reference time period, or whether a degree of change in speed of the host vehicle has reached a predetermined reference degree of change, after the movement control has been initiated, and
   end the movement control when the state in which the absolute value of the relative speed between the host vehicle and the other vehicle has been determined to be at or below the reference speed for the reference time period, or that the degree of change in the speed of the host vehicle has reached the reference degree of change.

2. The vehicle control device according to claim 1, wherein the processor is further configured to change the reference time period to be shorter for a greater reference speed.

3. The vehicle control device according to claim 1, wherein the processor is further configured to change the reference degree of change to be smaller with a higher speed of the host vehicle when initiating movement control.

4. The vehicle control device according to claim 1, wherein the processor is further configured to
   determine whether the driver is gripping a steering wheel or the driver is looking at a speed display unit, and the state in which the absolute value of the relative speed between the host vehicle and the other vehicle is at or below the reference speed has continued for the reference time period, and
   end the movement control when the driver is gripping the steering wheel or the driver is looking at the speed display unit, and the state in which the absolute value of the relative speed between the host vehicle and the other vehicle is at or below the reference speed has continued for the reference time period.

5. The vehicle control device according to claim 1, wherein the processor is further configured to determine whether the driver is gripping a steering wheel or the driver is looking at a speed display unit, and the degree of change in the speed of the host vehicle has reached the reference degree of change, and end the movement control when the driver is gripping the steering wheel or the driver is looking at the speed display unit, and the degree of change in the speed of the host vehicle has reached the reference degree of change.

6. The vehicle control device according to claim 1, wherein the processor is further configured to control the speed of the host vehicle so that the host vehicle is accelerated or decelerated in the direction opposite from the direction in which the speed of the host vehicle has changed by the movement control when ending the movement control.

7. A computer-readable, non-transitory storage medium storing a computer program for vehicle control, which causes a processor to execute a process, the process comprising:

determining whether a host vehicle is located in a blind spot zone of another vehicle based on information representing environment surrounding the host vehicle;

initiate movement control to cause movement of the host vehicle from the blind spot zone of the other vehicle to a location outside of the blind spot zone by changing speed of the host vehicle when the host vehicle has been determined to be located in the blind spot zone of the other vehicle;

determining whether a state in which an absolute value of relative speed between the host vehicle and the other vehicle is at or below a predetermined reference speed has continued for a predetermined reference time period, or whether a degree of change in speed of the host vehicle has reached a predetermined reference degree of change, after the movement control has been initiated; and end the movement control when the state in which the absolute value of the relative speed between the host vehicle and the other vehicle has been determined to be at or below the reference speed for the reference time period, or that the degree of change in the speed of the host vehicle has reached the reference degree of change.

* * * * *